(12) United States Patent
Ebsen et al.

(10) Patent No.: US 11,190,679 B2
(45) Date of Patent: Nov. 30, 2021

(54) ACCESSING MEDIA AT A GEOGRAPHIC LOCATION

(71) Applicant: Snap Inc., Santa Monica, CA (US)

(72) Inventors: Rylee Ebsen, Venice, CA (US); Nathan Jurgenson, Venice, CA (US); Ryan Marzolph, Venice, CA (US); Evan Spiegel, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 85 days.

(21) Appl. No.: 16/808,101

(22) Filed: Mar. 3, 2020

(65) Prior Publication Data
US 2020/0204726 A1 Jun. 25, 2020

Related U.S. Application Data

(63) Continuation of application No. 15/837,935, filed on Dec. 11, 2017, now Pat. No. 10,616,476, which is a (Continued)

(51) Int. Cl.
H04N 5/232 (2006.01)
H04L 29/06 (2006.01)
(Continued)

(52) U.S. Cl.
CPC ....... H04N 5/23222 (2013.01); G06F 16/487 (2019.01); G06F 16/9537 (2019.01); H04L 65/60 (2013.01); H04L 67/18 (2013.01); H04M 1/72457 (2021.01); H04N 5/23206 (2013.01); H04N 5/23229 (2013.01); H04N 5/232939 (2018.08); H04W 4/021 (2013.01); H04W 4/029 (2018.02); H04W 4/185 (2013.01)

(58) Field of Classification Search
None
See application file for complete search history.

(56) References Cited

U.S. PATENT DOCUMENTS 666,223 A 1/1901 Shedlock
4,581,634 A 4/1986 Williams
(Continued)

FOREIGN PATENT DOCUMENTS

CA 2887596 A1 7/2015
CN 102930107 A 2/2013
(Continued)

OTHER PUBLICATIONS

US 10,484,394 B2, 11/2019, Allen et al. (withdrawn)
(Continued)

Primary Examiner — Ranodhi Serrao
(74) Attorney, Agent, or Firm — Schwegman Lundberg & Woessner, P.A.

(57) ABSTRACT

A system and method for accessing a media item on a mobile device. The mobile device includes a media placement application receives a selection of a media item, generates access conditions for the media item based on geolocation and position information of the mobile device associated with the selected media item, and generates a notification that the selected media item is available to view in a display of the mobile device in response to determining that the geolocation and position of the mobile device meet the access conditions of the selected media item.

20 Claims, 23 Drawing Sheets

Related U.S. Application Data continuation of application No. 14/841,987, filed on Sep. 1, 2015, now Pat. No. 9,843,720, which is a continuation of application No. 14/682,259, filed on Apr. 9, 2015, now Pat. No. 9,143,681, which is a continuation of application No. 14/539,391, filed on Nov. 12, 2014, now Pat. No. 9,015,285.

(51) Int. Cl.
| | | |
|---|---|---|
| H04L 29/08 | (2006.01) | |
| H04W 4/029 | (2018.01) | |
| H04W 4/021 | (2018.01) | |
| H04W 4/18 | (2009.01) | |
| G06F 16/9537 | (2019.01) | |
| G06F 16/487 | (2019.01) | |
| H04M 1/72457 | (2021.01) | |

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Gamut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,091 B1 | 10/2006 | Khoo et al. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,025 B2 | 7/2007 | Stone et al. |
| 7,240,089 B2 | 7/2007 | Boudreau |
| 7,269,426 B2 | 9/2007 | Kekkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 7,991,638 B1 | 8/2011 | House et al. |
| 8,001,204 B2 | 8/2011 | Burtner et al. |
| 8,014,762 B2 | 9/2011 | Chmaytelli et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads et al. |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,290,513 B2 * | 10/2012 | Forstall .............. G01C 21/3697 455/456.3 |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |

(56) References Cited

U.S. PATENT DOCUMENTS

| | | | |
|---|---|---|---|
| 8,332,402 B2 * | 12/2012 | Forstall | G06F 16/9535 |
| | | | 707/736 |
| 8,332,475 B2 | 12/2012 | Rosen et al. | |
| 8,352,546 B1 | 1/2013 | Dollard | |
| 8,369,866 B2 | 2/2013 | Ashley, Jr. et al. | |
| 8,379,130 B2 | 2/2013 | Forutanpour et al. | |
| 8,385,950 B1 | 2/2013 | Wagner et al. | |
| 8,402,097 B2 | 3/2013 | Szeto | |
| 8,405,773 B2 | 3/2013 | Hayashi et al. | |
| 8,418,067 B2 | 4/2013 | Cheng et al. | |
| 8,423,409 B2 | 4/2013 | Rao | |
| 8,471,914 B2 | 6/2013 | Sakiyama et al. | |
| 8,472,935 B2 | 6/2013 | Fujisaki | |
| 8,494,481 B1 | 7/2013 | Bacco et al. | |
| 8,510,383 B2 | 8/2013 | Hurley et al. | |
| 8,527,345 B2 | 9/2013 | Rothschild et al. | |
| 8,548,735 B2 * | 10/2013 | Forstall | G06F 3/0482 |
| | | | 701/412 |
| 8,554,627 B2 | 10/2013 | Svendsen et al. | |
| 8,560,612 B2 | 10/2013 | Kilmer et al. | |
| 8,594,680 B2 | 11/2013 | Ledlie et al. | |
| 8,613,089 B1 | 12/2013 | Holloway et al. | |
| 8,660,358 B1 | 2/2014 | Bergboer et al. | |
| 8,660,369 B2 | 2/2014 | Llano et al. | |
| 8,660,793 B2 | 2/2014 | Ngo et al. | |
| 8,682,350 B2 | 3/2014 | Altman et al. | |
| 8,688,519 B1 | 4/2014 | Lin et al. | |
| 8,694,026 B2 * | 4/2014 | Forstall | H04L 67/18 |
| | | | 455/456.3 |
| 8,718,333 B2 | 5/2014 | Wolf et al. | |
| 8,724,622 B2 | 5/2014 | Rojas | |
| 8,732,168 B2 | 5/2014 | Johnson | |
| 8,744,523 B2 | 6/2014 | Fan et al. | |
| 8,745,132 B2 | 6/2014 | Obradovich | |
| 8,751,310 B2 | 6/2014 | Van Datta et al. | |
| 8,761,800 B2 | 6/2014 | Kuwahara | |
| 8,762,201 B1 | 6/2014 | Noonan | |
| 8,768,876 B2 | 7/2014 | Shim et al. | |
| 8,775,972 B2 | 7/2014 | Spiegel | |
| 8,788,680 B1 | 7/2014 | Naik | |
| 8,790,187 B2 | 7/2014 | Walker et al. | |
| 8,797,415 B2 | 8/2014 | Arnold | |
| 8,798,646 B1 | 8/2014 | Wang et al. | |
| 8,838,140 B1 * | 9/2014 | Ledet | H04W 4/12 |
| | | | 455/456.2 |
| 8,856,349 B2 | 10/2014 | Jain et al. | |
| 8,874,677 B2 | 10/2014 | Rosen et al. | |
| 8,886,227 B2 | 11/2014 | Schmidt et al. | |
| 8,909,679 B2 | 12/2014 | Root et al. | |
| 8,909,725 B1 | 12/2014 | Sehn | |
| 8,924,144 B2 * | 12/2014 | Forstall | H04W 4/029 |
| | | | 701/412 |
| 8,972,357 B2 | 3/2015 | Shim et al. | |
| 8,977,296 B1 | 3/2015 | Briggs et al. | |
| 8,995,433 B2 | 3/2015 | Rojas | |
| 9,015,285 B1 * | 4/2015 | Ebsen | H04L 65/60 |
| | | | 709/219 |
| 9,020,745 B2 | 4/2015 | Johnston et al. | |
| 9,040,574 B2 | 5/2015 | Wang et al. | |
| 9,043,329 B1 | 5/2015 | Patton et al. | |
| 9,055,416 B2 | 6/2015 | Rosen et al. | |
| 9,080,877 B2 * | 7/2015 | Dave | G01C 21/3647 |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,119,027 B2 | 8/2015 | Sharon et al. | |
| 9,123,074 B2 | 9/2015 | Jacobs et al. | |
| 9,137,700 B2 | 9/2015 | Elefant et al. | |
| 9,143,382 B2 | 9/2015 | Bhogal et al. | |
| 9,143,681 B1 | 9/2015 | Ebsen et al. | |
| 9,152,477 B1 | 10/2015 | Campbell et al. | |
| 9,191,776 B2 | 11/2015 | Root et al. | |
| 9,204,252 B2 | 12/2015 | Root | |
| 9,225,897 B1 | 12/2015 | Sehn et al. | |
| 9,258,459 B2 | 2/2016 | Hartley | |
| 9,277,365 B1 * | 3/2016 | Wilden | H04W 64/00 |
| 9,344,606 B2 | 5/2016 | Hartley et al. | |
| 9,385,983 B1 | 7/2016 | Sehn | |
| 9,396,354 B1 | 7/2016 | Murphy et al. | |
| 9,407,712 B1 | 8/2016 | Sehn | |
| 9,407,816 B1 | 8/2016 | Sehn | |
| 9,430,783 B1 | 8/2016 | Sehn | |
| 9,439,041 B2 | 9/2016 | Parvizi et al. | |
| 9,443,227 B2 | 9/2016 | Evans et al. | |
| 9,450,907 B2 | 9/2016 | Pridmore et al. | |
| 9,459,778 B2 | 10/2016 | Hogeg et al. | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,544,379 B2 | 1/2017 | Gauglitz et al. | |
| 9,591,445 B2 | 3/2017 | Zises | |
| 9,628,950 B1 | 4/2017 | Noeth et al. | |
| 9,648,581 B1 | 5/2017 | Vaynblat et al. | |
| 9,672,538 B1 | 6/2017 | Vaynblat et al. | |
| 9,674,660 B1 | 6/2017 | Vaynblat et al. | |
| 9,706,355 B1 | 7/2017 | Cali et al. | |
| 9,710,821 B2 | 7/2017 | Heath | |
| 9,802,121 B2 | 10/2017 | Ackley et al. | |
| 9,823,724 B2 * | 11/2017 | Vaccari | H04W 4/029 |
| 9,843,720 B1 | 12/2017 | Ebsen et al. | |
| 9,854,219 B2 | 12/2017 | Sehn | |
| 9,866,999 B1 | 1/2018 | Noeth | |
| 9,894,478 B1 | 2/2018 | Deluca et al. | |
| 10,080,102 B1 | 9/2018 | Noeth et al. | |
| 10,200,813 B1 | 2/2019 | Allen et al. | |
| 10,285,002 B2 | 5/2019 | Colonna et al. | |
| 10,285,006 B2 | 5/2019 | Colonna et al. | |
| 10,349,209 B1 | 7/2019 | Noeth et al. | |
| 10,395,519 B2 | 8/2019 | Colonna et al. | |
| 10,524,087 B1 | 12/2019 | Allen et al. | |
| 10,565,795 B2 * | 2/2020 | Charlton | G06T 19/003 |
| 10,616,476 B1 | 4/2020 | Ebsen et al. | |
| 2002/0032771 A1 | 3/2002 | Gledje | |
| 2002/0047868 A1 | 4/2002 | Miyazawa | |
| 2002/0078456 A1 | 6/2002 | Hudson et al. | |
| 2002/0087631 A1 | 7/2002 | Sharma | |
| 2002/0097257 A1 | 7/2002 | Miller et al. | |
| 2002/0098850 A1 | 7/2002 | Akhteruzzaman et al. | |
| 2002/0122659 A1 | 9/2002 | Megrath et al. | |
| 2002/0128047 A1 | 9/2002 | Gates | |
| 2002/0144154 A1 | 10/2002 | Tomkow | |
| 2003/0001846 A1 | 1/2003 | Davis et al. | |
| 2003/0016247 A1 | 1/2003 | Lai et al. | |
| 2003/0017823 A1 | 1/2003 | Mager et al. | |
| 2003/0020623 A1 | 1/2003 | Cao et al. | |
| 2003/0023874 A1 | 1/2003 | Prokupets et al. | |
| 2003/0037124 A1 | 2/2003 | Yamaura et al. | |
| 2003/0052925 A1 | 3/2003 | Daimon et al. | |
| 2003/0083929 A1 | 5/2003 | Springer et al. | |
| 2003/0101230 A1 | 5/2003 | Benschoter et al. | |
| 2003/0110503 A1 | 6/2003 | Perkes | |
| 2003/0126215 A1 | 7/2003 | Udell | |
| 2003/0148773 A1 | 8/2003 | Spriestersbach et al. | |
| 2003/0164856 A1 | 9/2003 | Prager et al. | |
| 2003/0229607 A1 | 12/2003 | Zellweger et al. | |
| 2004/0027371 A1 | 2/2004 | Jaeger | |
| 2004/0064429 A1 | 4/2004 | Hirstius et al. | |
| 2004/0078367 A1 | 4/2004 | Anderson et al. | |
| 2004/0111467 A1 | 6/2004 | Willis | |
| 2004/0158739 A1 | 8/2004 | Wakai et al. | |
| 2004/0185877 A1 | 9/2004 | Asthana et al. | |
| 2004/0189465 A1 | 9/2004 | Capobianco et al. | |
| 2004/0193488 A1 | 9/2004 | Khoo et al. | |
| 2004/0203959 A1 | 10/2004 | Coombes | |
| 2004/0215625 A1 | 10/2004 | Svendsen et al. | |
| 2004/0243531 A1 | 12/2004 | Dean | |
| 2004/0243688 A1 | 12/2004 | Wugofski | |
| 2004/0243704 A1 | 12/2004 | Botelho et al. | |
| 2005/0021444 A1 | 1/2005 | Bauer et al. | |
| 2005/0022211 A1 | 1/2005 | Veselov et al. | |
| 2005/0048989 A1 | 3/2005 | Jung | |

(56) References Cited

U.S. PATENT DOCUMENTS

| | | |
|---|---|---|
| 2005/0078804 A1 | 4/2005 | Yomoda |
| 2005/0097176 A1 | 5/2005 | Schatz et al. |
| 2005/0102180 A1 | 5/2005 | Gailey et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0136297 A1 | 6/2006 | Wilis et al. |
| 2006/0242239 A1 | 10/2006 | Morishima et al. |
| 2006/0252438 A1 | 11/2006 | Ansamaa et al. |
| 2006/0259359 A1 | 11/2006 | Gogel |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buran et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0268988 A1 | 11/2007 | Hedayat et al. |
| 2007/0281690 A1 | 12/2007 | Altman et al. |
| 2008/0012987 A1 | 1/2008 | Hirata et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033795 A1 | 2/2008 | Wishnow et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0160956 A1 | 7/2008 | Jackson et al. |
| 2008/0167106 A1 | 7/2008 | Lutnick |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0021421 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0284587 A1 | 11/2008 | Saigh et al. |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0019472 A1 | 1/2009 | Cleland et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0008971 A1 | 4/2009 | Wood et al. |
| 2009/0089169 A1 | 4/2009 | Gupta et al. |
| 2009/0089678 A1 | 4/2009 | Sacco et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Bartel Marinus |
| 2009/0177588 A1 | 7/2009 | Marchese |
| 2009/0177730 A1 | 7/2009 | Annamalai et al. |
| 2009/0192900 A1 | 7/2009 | Collision |
| 2009/0197582 A1 | 8/2009 | Lewis et al. |
| 2009/0197616 A1 | 8/2009 | Lewis et al. |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0041378 A1 | 2/2010 | Aceves et al. |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0115281 A1 | 5/2010 | Camenisch et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0153197 A1 | 6/2010 | Byon |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |

(56) References Cited

U.S. PATENT DOCUMENTS

| | | |
|---|---|---|
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0211431 A1 | 8/2010 | Lutnick et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0262461 A1 | 10/2010 | Bohannon |
| 2010/0273509 A1 | 10/2010 | Sweeney et al. |
| 2010/0281045 A1 | 11/2010 | Dean |
| 2010/0306669 A1 | 12/2010 | Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0131633 A1 | 6/2011 | Macaskill et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0170838 A1 | 7/2011 | Rosengart et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238300 A1 | 9/2011 | Schenken |
| 2011/0238763 A1 | 9/2011 | Shin et al. |
| 2011/0251790 A1 | 10/2011 | Liotopoulos et al. |
| 2011/0255736 A1 | 10/2011 | Thompson et al. |
| 2011/0256881 A1 | 10/2011 | Huang et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0294541 A1 | 12/2011 | Zheng et al. |
| 2011/0295577 A1 | 12/2011 | Ramachandran |
| 2011/0295677 A1 | 12/2011 | Dhingra et al. |
| 2011/0314419 A1 | 12/2011 | Dunn et al. |
| 2011/0320373 A1 | 12/2011 | Lee et al. |
| 2012/0023522 A1 | 1/2012 | Anderson et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054001 A1 | 3/2012 | Zivkovic et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123867 A1 | 5/2012 | Hannan |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0129548 A1 | 5/2012 | Rao et al. |
| 2012/0131507 A1 | 5/2012 | Sparandara et al. |
| 2012/0131512 A1 | 5/2012 | Takeuchi et al. |
| 2012/0001651 A1 | 6/2012 | Lalancette et al. |
| 2012/0143760 A1 | 6/2012 | Abulafia et al. |
| 2012/0150978 A1 | 6/2012 | Monaco |
| 2012/0166468 A1 | 6/2012 | Gupta et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197690 A1 | 8/2012 | Agulnek |
| 2012/0197724 A1 | 8/2012 | Kendall |
| 2012/0200743 A1 | 8/2012 | Blanchflower et al. |
| 2012/0208564 A1 | 8/2012 | Clark et al. |
| 2012/0209892 A1 | 8/2012 | Macaskill et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0271684 A1 | 10/2012 | Shutter |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0006777 A1 | 1/2013 | Krishnareddy et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0115872 A1 | 5/2013 | Huang et al. |
| 2013/0122862 A1 | 5/2013 | Horn et al. |
| 2013/0122929 A1 | 5/2013 | Al-mufti et al. |
| 2013/0124297 A1 | 5/2013 | Hegeman et al. |
| 2013/0128059 A1 | 5/2013 | Kristensson |
| 2013/0129252 A1 | 5/2013 | Lauper |
| 2013/0132194 A1 | 5/2013 | Rajaram |
| 2013/0132477 A1 | 5/2013 | Bosworth et al. |
| 2013/0145286 A1 | 6/2013 | Feng et al. |
| 2013/0157684 A1 | 6/2013 | Moser |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173380 A1 | 7/2013 | Akbari et al. |
| 2013/0173729 A1 | 7/2013 | Starenky et al. |

(56) References Cited

U.S. PATENT DOCUMENTS

| | | |
|---|---|---|
| 2013/0182133 A1 | 7/2013 | Tanabe |
| 2013/0185131 A1 | 7/2013 | Sinha |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp |
| 2013/0254227 A1 | 9/2013 | Shim |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304527 A1 | 11/2013 | Santos, III |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0095296 A1 | 4/2014 | Angell et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129627 A1 | 5/2014 | Baldwin et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0156410 A1 | 6/2014 | Wuersch et al. |
| 2014/0164118 A1 | 6/2014 | Polachi |
| 2014/0172542 A1 | 6/2014 | Poncz et al. |
| 2014/0173424 A1 | 6/2014 | Hogeg et al. |
| 2014/0173457 A1 | 6/2014 | Wang et al. |
| 2014/0180829 A1 | 6/2014 | Umeda |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279040 A1 | 9/2014 | Kuboyama |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0337123 A1 | 11/2014 | Nuernberg et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0130178 A1 | 5/2015 | Clements |
| 2015/0142753 A1 | 5/2015 | Soon-shiong |
| 2015/0154650 A1 | 6/2015 | Umeda |
| 2015/0169827 A1 | 6/2015 | Laborde |
| 2015/0172534 A1 | 6/2015 | Miyakawaa et al. |
| 2015/0178260 A1 | 6/2015 | Brunson |
| 2015/0186497 A1 | 7/2015 | Patton et al. |
| 2015/0222814 A1 | 8/2015 | Li et al. |
| 2015/0237472 A1 | 8/2015 | Alsina et al. |
| 2015/0237473 A1 | 8/2015 | Koepke |
| 2015/0254704 A1 | 9/2015 | Kothe et al. |
| 2015/0261917 A1 | 9/2015 | Smith |
| 2015/0262208 A1 | 9/2015 | Bjontegard |
| 2015/0269624 A1 | 9/2015 | Cheng et al. |
| 2015/0271779 A1 | 9/2015 | Alavudin |
| 2015/0287072 A1 | 10/2015 | Golden et al. |
| 2015/0294367 A1 | 10/2015 | Oberbrunner et al. |
| 2015/0312184 A1 | 10/2015 | Langholz et al. |
| 2015/0332310 A1 | 11/2015 | Cui et al. |
| 2015/0332317 A1 | 11/2015 | Cui et al. |
| 2015/0332325 A1 | 11/2015 | Sharma et al. |
| 2015/0332329 A1 | 11/2015 | Luo et al. |
| 2015/0341747 A1 | 11/2015 | Barrand et al. |
| 2015/0350136 A1 | 12/2015 | Flynn, III et al. |
| 2015/0358806 A1 | 12/2015 | Salqvist |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0019592 A1 | 1/2016 | Muttineni et al. |
| 2016/0034712 A1 | 2/2016 | Patton et al. |
| 2016/0085773 A1 | 3/2016 | Chang et al. |
| 2016/0085863 A1 | 3/2016 | Allen et al. |
| 2016/0098742 A1 | 4/2016 | Minicucci et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0210657 A1 | 7/2016 | Chittilappilly et al. |
| 2016/0239248 A1 | 8/2016 | Sehn |
| 2016/0277419 A1 | 9/2016 | Allen et al. |
| 2016/0292735 A1 | 10/2016 | Kim |
| 2016/0321708 A1 | 11/2016 | Sehn |
| 2017/0006094 A1 | 1/2017 | Abou Mahmoud et al. |
| 2017/0026786 A1 | 1/2017 | Barron et al. |
| 2017/0061308 A1 | 3/2017 | Chen et al. |
| 2017/0078760 A1 | 3/2017 | Christoph et al. |
| 2017/0091795 A1 | 3/2017 | Mansour et al. |
| 2017/0127233 A1 | 5/2017 | Liang et al. |
| 2017/0132647 A1 | 5/2017 | Bostick et al. |
| 2017/0164161 A1 | 6/2017 | Gupta et al. |
| 2017/0186038 A1 | 6/2017 | Glover et al. |
| 2017/0222962 A1 | 8/2017 | Gauglitz et al. |
| 2017/0230315 A1 | 8/2017 | Zubas et al. |
| 2017/0287006 A1 | 10/2017 | Azmoodeh et al. |
| 2017/0339521 A1 | 11/2017 | Colonna et al. |
| 2017/0359686 A1 | 12/2017 | Colonna et al. |
| 2018/0121957 A1 | 5/2018 | Cornwall et al. |
| 2018/0189835 A1 | 7/2018 | Deluca et al. |
| 2018/0225687 A1 | 8/2018 | Ahmed et al. |
| 2019/0372991 A1 | 12/2019 | Allen et al. |

FOREIGN PATENT DOCUMENTS

| | | |
|---|---|---|
| CN | 1032002384 | 7/2013 |
| CN | 105760466 A | 7/2016 |
| CN | 107637099 A | 1/2018 |
| CN | 110249359 A | 9/2019 |
| EP | 2051480 A1 | 4/2009 |
| EP | 2151797 A1 | 2/2010 |
| GB | 2399928 A | 9/2004 |

(56) References Cited

FOREIGN PATENT DOCUMENTS

| | | |
|---|---|---|
| KR | 19990073076 A | 10/1999 |
| KR | 20010078417 A | 8/2001 |
| KR | 10-2035405 B1 | 10/2019 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014172388 A1 | 10/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016123381 A1 | 8/2016 |
| WO | WO-2016149594 A1 | 9/2016 |
| WO | WO-2016179166 A1 | 11/2016 |
| WO | WO-2018144931 A1 | 8/2018 |

OTHER PUBLICATIONS

US 10,542,011 B2, 01/2020, Allen et al. (withdrawn)
"U.S. Appl. No. 14/494,226, Appeal Brief filed Mar. 1, 2019 in response to Final Office Action dated Jun. 1, 2018", 29 pgs.
"U.S. Appl. No. 14/529,064, Final Office Action dated Jan. 25, 2018", 39 pgs.
"U.S. Appl. No. 14/529,064, Non Final Office Action dated Jul. 13, 2018", 38 pgs.
"U.S. Appl. No. 14/529,064, Response filed May 25, 2018 to Final Office Action dated Jan. 25, 2018", 20 pgs.
"U.S. Appl. No. 14/548,590, Advisory Action dated Apr. 19, 2018", 2 pgs.
"U.S. Appl. No. 14/548,590, Appeal Brief Filed Apr. 20, 2018", 28 pgs,.
"U.S. Appl. No. 15/074,029, Advisory Action dated Oct. 11, 2018", 3 pgs.
"U.S. Appl. No. 15/074,029, Corrected Notice of Allowability dated Feb. 5, 2020", 4 pgs.
"U.S. Appl. No. 15/074,029, Corrected Notice of Allowability dated Aug. 20, 2019", 10 pgs.
"U.S. Appl. No. 15/074,029, Final Office Action dated Jun. 28, 2018", 22 pgs.
"U.S. Appl. No. 15/074,029, Non Final Office Action dated Jan. 23, 2019", 19 pgs.
"U.S. Appl. No. 15/074,029, Non Final Office Action dated Nov. 30, 2017", 16 pgs.
"U.S. Appl. No. 15/074,029, Notice of Allowance dated Jun. 19, 2019", 14 pgs.
"U.S. Appl. No. 15/074,029, Response filed Feb. 28, 2018 to Non Final Office Action dated Nov. 30, 2017", 12 pgs.
"U.S. Appl. No. 15/074,029, Response filed Aug. 28, 2018 to Final Office Action dated Jun. 28, 2018", 21 pgs.
"U.S. Appl. No. 15/074,029, Response filed Apr. 23, 2019 to Non Final Office Action dated Jan. 23, 2019", 15 pgs.
"U.S. Appl. No. 15/298,806, Advisory Action dated Jan. 29, 2018", 4 pgs.
"U.S. Appl. No. 15/298,806, Examiner interview Summary dated Jan. 12, 2018", 3 pgs.
"U.S. Appl. No. 15/298,806, Examiner Interview Summary dated Aug. 13, 2018", 3 pgs.
"U.S. Appl. No. 15/298,806, Final Office Action dated Oct. 24, 2017", 15 pgs.
"U.S. Appl. No. 15/298,806, Non Final Office Action dated May 17, 2018", 16 pgs.
"U.S. Appl. No. 15/298,806, Notice of Allowance dated Sep. 19, 2018", 5 pgs.
"U.S. Appl. No. 15/298,806, Response filed Jan. 9, 2018 to Final Office Action dated Oct. 24, 2017", 17 pgs.
"U.S. Appl. No. 15/298,806, Response filed Aug. 10, 2018 to Non Final Office Action dated May 17, 2018", 15 pgs.
"U.S. Appl. No. 15/424,184, Examiner interview Summary dated Jan. 10, 2019", 3 pgs.
"U.S. Appl. No. 15/424,184, Examiner Interview Summary dated Jul. 30, 2019", 2 pgs.
"U.S. Appl. No. 15/424,184, Final Office Action dated Jan. 29, 2019", 14 pgs.
"U.S. Appl. No. 15/424,184, Final Office Action dated Sep. 9, 2019", 13 pgs.
"U.S. Appl. No. 15/424,184, Non Final Office Action dated May 21, 2019", 16 pgs.
"U.S. Appl. No. 15/424,184, Non Final Office Action dated Nov. 30, 2018", 22 pgs.
"U.S. Appl. No. 15/424,184, Non Final Office Action dated Dec. 2, 2019", 16 pgs.
"U.S. Appl. No. 15/424,184, Response filed Aug. 21, 2019 to Non Final Office Action dated May 21, 2019", 12 pgs.
"U.S. Appl. No. 15/424,184, Response filed Nov. 11, 2019 to Final Office Action dated Sep. 9, 2019", 12 pgs.
"U.S. Appl. No. 15/424,184, Response filed Apr. 29, 2019 to Final Office Action dated Jan. 29, 2019", 11 pgs.
"U.S. Appl. No. 15/424,184k, Response filed Jan. 4, 2019 to Non Final Office Action dated Nov. 30, 2018", 17 pgs.
"U.S. Appl. No. 15/474,821, Advisory Action dated Dec. 19, 2019", 3 pgs.
"U.S. Appl. No. 15/474,821, Final Office Action dated Sep. 3, 2019", 19 pgs.
"U.S. Appl. No. 15/474,821, Non Final Office Action dated Jan. 25, 2019", 17 pgs.
"U.S. Appl. No. 15/474,821, Response filed Apr. 25, 2019 to Non Final Office Action dated Jan. 25, 2019", 16 pgs.
"U.S. Appl. No. 15/474,821, Response filed on Dec. 2, 2019 to Final Office Action dated Sep. 3, 2019", 10 pgs.
"U.S. Appl. No. 15/835,100, Non Final Office Action dated Jan. 23, 2018", 18 pgs.
"U.S. Appl. No. 15/835,100, Notice of Allowance dated May 22, 2018", 5 pgs.
"U.S. Appl. No. 15/835,100, Response Filed Apr. 23, 2018 to Non Final Office Action dated Jan. 23, 2018", 11 pgs.
"U.S. Appl. No. 15/946,990, Final Office Action dated May 9, 2019", 11 pgs.
"U.S. Appl. No. 15/946,990, Non Final Office Action dated Dec. 3, 2018", 10 pgs.
"U.S. Appl. No. 15/946,990, Notice of Allowance dated Sep. 24, 2019", 5 pgs.
"U.S. Appl. No. 15/946,990, Response filed Feb. 20, 2019 to Non Final Office Action dated Dec. 3, 2018", 11 pgs.
"U.S. Appl. No. 15/946,990, Response filed Jul. 9, 2019 to Final Office Action dated May 9, 2019", 12 pgs.
"U.S. Appl. No. 16/105,687, Non Final Office Action dated Sep. 14, 2018", 11 pgs.
"U.S. Appl. No. 16/105,687, Notice of Allowance dated Feb. 25, 2019", 8 pgs.
"U.S. Appl. No. 16/105,687, Response filed Dec. 14, 2018 to Non Final Office Action dated Sep. 14, 2018", 12 pgs.
"U.S. Appl. No. 16/219,577, Non Final Office Action dated Oct. 29, 2019", 7 pgs.
"U.S. Appl. No. 16/219,577, Notice of Allowance dated Jan. 15, 2020", 7 pgs.
"U.S. Appl. No. 16/219,577, Response filed Oct. 3, 2019 to Restriction Requirement dated Aug. 7, 2019", 6 pgs.

(56) References Cited

OTHER PUBLICATIONS

"U.S. Appl. No. 16/219,577, Response filed Dec. 5, 2019 to Non Final Office Action dated Oct. 29, 2019", 6 pgs.
"U.S. Appl. No. 16/219,577, Restriction Requirement dated Aug. 7, 2019", 6 pgs.
"U.S. Appl. No. 16/428,210, Preliminary Amendment filed Aug. 8, 2019", 8 pgs.
"Chinese Application Serial No. 201680027177.8, Office Action dated Oct. 28, 2019", W/English Translation, 15 pgs.
"Connecting To Your Customers In the Triangle and Beyond", Newsobserver.com, (2013), 16 pgs.
"Demystifying Location Data Accuracy", Mobile Marketing Association, (Nov. 2015), 18 pgs.
"European Application Serial No. 16716090.2, Communication Pursuant to Article 94(3) EPC dated Jan. 15, 2020", 6 pgs.
"European Application Serial No. 16716090.2, Response filed May 21, 2018 to Communication pursuant to Rules 161(1) and 162 EPC dated Nov. 10, 2017", w/ English Claims, 89 pgs.
"European Application Serial No. 18747246.9, Extended European Search Report dated Nov. 7, 2019", 7 pgs.
"Geofencing and the event industry", Goodbarber Blog, [Online] Retrieved from the Internet by the examiner on May 16, 2019: <URL: https://www.goodbarber.com/blog/geofencing-and-the-event-industry-a699/>, (Nov. 9, 2015), 7 pgs.
"IAB Platform Status Report: A Mobile Advertising Review", Interactive Advertising Bureau, (Jul. 2008), 24 pgs.
"International Application Serial No. PCT/US2018/016723, International Preliminary Report on Patentability dated Aug. 15, 2019", 19 pgs.
"International Application Serial No. PCT/US2018/016723, international Search Report dated Apr. 5, 2018", 2 pgs.
"International Application Serial No. PCT/US2018/016723, Written Opinion dated Apr. 5, 2018", 17 pgs.
"Korean Application Serial No. 10-2017-7029861, Notice of Preliminary Rejection dated Jan. 17, 2019", w/ English Translation, 9 pgs.
"Korean Application Serial No. 10-2017-7029861, Response filed Mar. 15, 2019 to Notice of Preliminary Rejection dated Jan. 17, 2019", w/ English Claims, 20 pgs.
"Korean Application Serial No. 10-2019-7030235, Notice of Preliminary Rejection dated Nov. 28, 2019", w/ English Translation, 10 pgs.
"Korean Application Serial No. 10-2019-7030235, Response filed Jan. 28, 2020 to Notice of Preliminary Rejection dated Nov. 28, 2019", w/ English Claims, 12 pgs.
"Mobile Location User Cases and Case Studies", Interactive Advertising Bureau, (Mar. 2014), 25 pgs.
"WIPO; International Preliminary Report; WO201776739", (dated Sep. 10, 2018), 5 pgs.
"WIPO; Search Strategy; WO201776739", (dated Dec. 10, 2017), 6 pgs.
Carr, Dale, "Mobile Ad Targeting: A Labor of Love", Ad Week, [Online] Retrieved from the Internet on Feb. 11, 2019: <URL: https://www.adweek.com/digital/mobile-ad-targeting-a-labor-of-love/>, (Feb. 12, 2016), 7 pgs.
Kumar, S, "Optimization Issues in Web and Mobile Advertising", Chapter 2—Pricing Models in Web Advertising, SpringerBriefs in Operations Management, (2016), 6 pgs.
Naylor, Joseph, "Geo-Precise Targeting: It's time to Get off the Fence", Be In The Know Blog, [Online] Retrieved from the Internet by the examiner on May 16, 2019: <URL: http://blog.cmglocalsolutions.com/geo-precise-targeting-its-time-to-get-off-the-fence>, (May 15, 2015), 6 pgs.
Palmer, Alex, "Geofencing at events: how to reach potential customers live and on-site", Streetfight Mag, [Online] Retrieved form the internet by the examiner on May 16, 2019: <URL: http://streetfightmag.com/2015/08/20/geofencing-at-events-how-to-reach-potential-customers-live-and-on-site>, (Aug. 20, 2015), 6 pgs.
Peterson, Lisa, et al., "Location-Based Advertising", Peterson Mobility Solutions, (Dec. 2009), 39 pgs.
Quercia, Daniele, et al., "Mobile Phones and Outdoor Advertising: Measurable Advertising", IEEE Persuasive Computing, (2011), 9 pgs.
Simonite, Tom, "Mobile Data: A Gold Mine for Telcos", MIT Technology Review, (May 27, 2010), 6 pgs.
Virgillito, Dan, "Facebook Introduces Mobile Geo-Fencing With Local Awareness Ads", Adespresso, [Online] Retrieved from the Internet by the examiner on May 16, 2019: <URL: https://adespresso.com/blog/facebook-local-business-ads-geo-fencing/>, (Oct. 8, 2014), 14 pgs.
"A Whole New Story", Snap, Inc., [Online] Retrieved from the internet: <URL: https://www.snap.com/en-US/news/>, (2017), 13 pgs.
"Adding photos to your listing", eBay, [Online] Retrieved from the internet: <URL: http://pages.ebay.com/help/sell/pictures.html>, (accessed May 24, 2017), 4 pgs.
"U.S. Appl. No. 14/304,855, Corrected Notice of Allowance dated Jun. 26, 2015", 8 pgs.
"U.S. Appl. No. 14/304,855, Final Office Action dated Feb. 18, 2015", 10 pgs.
"U.S. Appl. No. 14/304,855, Non Final Office Action dated Mar. 18, 2015", 9 pgs.
"U.S. Appl. No. 14/304,855, Non Final Office Action dated Oct. 22, 2014", 11 pgs.
"U.S. Appl. No. 14/304,855, Notice of Allowance dated Jun. 1, 2015", 11 pgs.
"U.S. Appl. No. 14/304,855, Response filed Feb. 25, 2015 to Final Office Action dated Feb. 18, 2015", 5 pgs.
"U.S. Appl. No. 14/304,855, Response filed Apr. 1, 2015 to Non Final Office Action dated Mar. 18, 2015", 4 pgs.
"U.S. Appl. No. 14/304,855, Response filed Nov. 7, 2014 to Non Final Office Action dated Oct. 22, 2014", 5 pgs.
"U.S. Appl. No. 14/494,226, Examiner Interview Summary dated Oct. 27, 2016", 3 pgs.
"U.S. Appl. No. 14/494,226, Examiner Interview Summary dated Dec. 20, 2017", 2 pgs.
"U.S. Appl. No. 14/494,226, Final Office Action dated Mar. 7, 2017", 34 pgs.
"U.S. Appl. No. 14/494,226, Final Office Action dated Jun. 1, 2018", 33 pgs.
"U.S. Appl. No. 14/494,226, Non Final Office Action dated Sep. 7, 2017", 36 pgs.
"U.S. Appl. No. 14/494,226, Non Final Office Action dated Sep. 12, 2016", 32 pgs.
"U.S. Appl. No. 14/494,226, Response filed Jan. 8, 2018 to Non Final Office Action dated Sep. 7, 2017", 15 pgs.
"U.S. Appl. No. 14/494,226, Response filed Jul. 7, 2017 to Final Office Action dated Mar. 7, 2017", 13 pgs.
"U.S. Appl. No. 14/494,226, Response filed Dec. 12, 2016 to Non Final Office Action dated Sep. 12, 2016", 16 pgs.
"U.S. Appl. No. 14/505,478, Advisory Action dated Apr. 14, 2015", 3 pgs.
"U.S. Appl. No. 14/505,478, Corrected Notice of Allowance dated May 18, 2016", 2 pgs.
"U.S. Appl. No. 14/505,478, Corrected Notice of Allowance dated Jul. 22, 2016", 2 pgs.
"U.S. Appl. No. 14/505,478, Final Office Action dated Mar. 17, 2015", 16 pgs.
"U.S. Appl. No. 14/505,478, Non Final Office Action dated Jan. 27, 2015", 13 pgs.
"U.S. Appl. No. 14/505,478, Non Final Office Action dated Sep. 4, 2015", 19 pgs.
"U.S. Appl. No. 14/505,478, Notice of Allowance dated Apr. 28, 2016", 11 pgs.
"U.S. Appl. No. 14/505,478, Notice of Allowance dated Aug. 26, 2016", 11 pgs.
"U.S. Appl. No. 14/505,478, Response filed Jan. 30, 2015 to Non Final Office Action dated Jan. 27, 2015", 10 pgs.
"U.S. Appl. No. 14/505,478, Response filed Mar. 4, 2016 to Non Final Office Action dated Sep. 4, 2015", 12 pgs.
"U.S. Appl. No. 14/505,478, Response filed Apr. 1, 2015 to Final Office Action dated Mar. 17, 2015", 6 pgs.

(56) References Cited

OTHER PUBLICATIONS

"U.S. Appl. No. 14/506,4/8, Response filed Aug. 17, 2015 to Advisory Action dated Apr. 14, 2015", 10 pgs.
"U.S. Appl. No. 14/523,728, Non Final Office Action dated Dec. 12, 2014", 10 pgs.
"U.S. Appl. No. 14/523,728, Notice of Allowance dated Mar. 24, 2015", 8 pgs.
"U.S. Appl. No. 14/523,728, Notice of Allowance dated Apr. 15, 2015", 8 pgs.
"U.S. Appl. No. 14/523,728, Notice of Allowance dated Jun. 5, 2015", 8 pgs.
"U.S. Appl. No. 14/523,728, Response filed Aug. 25, 2014 to Non Final Office Action dated Jan. 16, 2015", 5 pgs.
"U.S. Appl. No. 14/529,064, Examiner Interview Summary dated May 23, 2016", 3 pgs.
"U.S. Appl. No. 14/529,064, Examiner Interview Summary dated Nov. 17, 2016", 3 pgs.
"U.S. Appl. No. 14/529,064, Final Office Action dated Aug. 11, 2015", 23 pgs.
"U.S. Appl. No. 14/529,064, Final Office Action dated Aug. 24, 2016", 23 pgs.
"U.S. Appl. No. 14/529,064, Non Final Office Action dated Mar. 12, 2015", 20 pgs.
"U.S. Appl. No. 14/529,064, Non Final Office Action dated Apr. 6, 2017", 25 pgs.
"U.S. Appl. No. 14/529,064, Non Final Office Action dated Apr. 18, 2016", 21 pgs.
"U.S. Appl. No. 14/529,064, Response filed Feb. 5, 2015 to Restriction Requirement dated Feb. 2, 2015", 6 pgs.
"U.S. Appl. No. 14/529,064, Response filed Mar. 26, 2015 to Non Final Office Action dated Mar. 12, 2015", 8 pgs.
"U.S. Appl. No. 14/529,064, Response filed Jul. 18, 2016 to Non Final Office Action dated Apr. 18, 2016", 20 pgs.
"U.S. Appl. No. 14/529,064, Response filed Sep. 6, 2017 to Non Final Office Action dated Apr. 6, 2017", 19 pgs.
"U.S. Appl. No. 14/529,064, Response filed Oct. 12, 2015 to Final Office Action dated Aug. 11, 2015", 19 pgs.
"U.S. Appl. No. 14/529,064, Response filed Dec. 21, 2016 to Final Office Action dated Aug. 24, 2016", 17 pgs.
"U.S. Appl. No. 14/529,064, Restriction Requirement dated Feb. 2, 2015", 5 pgs.
"U.S. Appl. No. 14/539,391, Notice of Allowance dated Mar. 5, 2015", 17 pgs.
"U.S. Appl. No. 14/548,590, Advisory Action dated Nov. 18, 2016", 3 pgs.
"U.S. Appl. No. 14/548,590, Final Office Action dated Jul. 5, 2016", 16 pgs.
"U.S. Appl. No. 14/548,590, Final Office Action dated Jul. 18, 2017", 20 pgs.
"U.S. Appl. No. 14/548,590, Final Office Action dated Sep. 16, 2015", 15 pgs.
"U.S. Appl. No. 14/548,590, Non Final Office Action dated Jan. 9, 2017", 14 pgs.
"U.S. Appl. No. 14/548,590, Non Final Office Action dated Feb. 11, 2016", 16 pgs.
"U.S. Appl. No. 14/548,590, Non Final Office Action dated Apr. 20, 2015", 14 pgs.
"U.S. Appl. No. 14/548,590, Response filed May 9, 2017 to Non Final Office Action dated Jan. 9, 2017", 17 pgs.
"U.S. Appl. No. 14/548,590, Response filed May 10, 2016 to Non Final Office Action dated Feb. 11, 2016", 14 pgs.
"U.S. Appl. No. 14/548,590, Response filed Nov. 7, 2016 to Final Office Action dated Jul. 5, 2016", 14 pgs.
"U.S. Appl. No. 14/548,590, Response filed Dec. 16, 2015 to Final Office Action dated Sep. 16, 2015", 13 pgs.
"U.S. Appl. No. 14/548,590, Response filed Jun. 16, 2015 to Non Final Office Action dated Apr. 20, 2015", 19 pgs.
"U.S. Appl. No. 14/578,258, Examiner Interview Summary dated Nov. 25, 2015", 3 pgs.
"U.S. Appl. No. 14/578,258, Non Final Office Action dated Jun. 10, 2015", 12 pgs.
"U.S. Appl. No. 14/578,258, Notice of Allowance dated Feb. 26, 2016", 5 pgs.
"U.S. Appl. No. 14/578,258, Response filed Dec. 10, 2015 to Non Final Office Action dated Jun. 10, 2015", 11 pgs.
"U.S. Appl. No. 14/578,271, Final Office Action dated Dec. 3, 2015", 15 pgs.
"U.S. Appl. No. 14/578,271, Non Final Office Action dated Aug. 7, 2015", 12 pgs.
"U.S. Appl. No. 14/578,271, Notice of Allowance dated Dec. 7, 2016", 7 pgs.
"U.S. Appl. No. 14/578,271, Response filed Feb. 9, 2016 to Final Office Action dated Dec. 3, 2015", 10 pgs.
"U.S. Appl. No. 14/578,271, Response filed Jun. 19, 2015 to Restriction Requirement dated Apr. 23, 2015", 6 pgs.
"U.S. Appl. No. 14/578,271, Response filed Oct. 28, 2015 to Non Final Office Action dated Aug. 7, 2015", 9 pgs.
"U.S. Appl. No. 14/578,271, Restriction Requirement dated Apr. 23, 2015", 8 pgs.
"U.S. Appl. No. 14/594,410, Non Final Office Action dated Jan. 4, 2016", 10 pgs.
"U.S. Appl. No. 14/594,410, Notice of Allowance dated Aug. 2, 2016", 5 pgs.
"U.S. Appl. No. 14/594,410, Notice of Allowance dated Dec. 15, 2016", 6 pgs.
"U.S. Appl. No. 14/594,410, Response filed Jul. 1, 2016 to Non Final Office Action dated Jan. 4, 2016", 10 pgs.
"U.S. Appl. No. 14/612,692, Examiner Interview Summary dated Jan. 29, 2016", 5 pgs.
"U.S. Appl. No. 14/612,692, Examiner Interview Summary dated Jul. 6, 2016", 4 pgs.
"U.S. Appl. No. 14/612,692, Examiner Interview Summary dated Aug. 14, 2015", 3 pgs.
"U.S. Appl. No. 14/612,692, Examiner Interview Summary dated Sep. 8, 2016", 3 pgs.
"U.S. Appl. No. 14/612,692, Final Office Action dated Aug. 15, 2016", 18 pgs.
"U.S. Appl. No. 14/612,692, Final Office Action dated Nov. 23, 2015", 15 pgs.
"U.S. Appl. No. 14/612,692, Non Final Office Action dated Jan. 3, 2017", 17 pgs.
"U.S. Appl. No. 14/612,692, Non Final Office Action dated Mar. 28, 2016", 15 pgs.
"U.S. Appl. No. 14/612,692, Non Final Office Action dated Jul. 20, 2015", 25 pgs.
"U.S. Appl. No. 14/612,692, Response filed Feb. 23, 2016 to Final Office Action dated Nov. 23, 2015", 10 pgs.
"U.S. Appl. No. 14/612,692, Response filed May 3, 2017 to Non Final Office Action dated Jan. 3, 2017", 18 pgs.
"U.S. Appl. No. 14/612,692, Response filed Nov. 14, 2016 to Final Office Action dated Aug. 15, 2016", 15 pgs.
"U.S. Appl. No. 14/612,692, Response filed Jun. 28, 2016 to Non Final Office Action dated Mar. 28, 2016", 14 pgs.
"U.S. Appl. No. 14/612,692. Response filed Oct. 19, 2015 to Non Final Office Action dated Jul. 20, 2015", 11 pgs.
"U.S. Appl. No. 14/634,417, Advisory Action dated Mar. 14, 2017", 3 pgs.
"U.S. Appl. No. 14/634,417, Final Office Action dated Jan. 31, 2017", 27 pgs.
"U.S. Appl. No. 14/634,417, Non Final Office Action dated Aug. 30, 2016", 23 pgs.
"U.S. Appl. No. 14/634,417, Response filed Mar. 2, 2017 to Final Office Action dated Jan. 31, 2017", 23 pgs.
"U.S. Appl. No. 14/634,417, Response filed Nov. 30, 2016 to Non Final Office Action dated Aug. 30, 2016", 18 pgs.
"U.S. Appl. No. 14/682,259, Notice of Allowance dated Jul. 27, 2015", 17 pgs.
"U.S. Appl. No. 14/704,212, Final Office Action dated Jun. 17, 2016", 12 pgs.
"U.S. Appl. No. 14/704,212, Non Final Office Action dated Dec. 4, 2015", 17 pgs.

(56) References Cited

OTHER PUBLICATIONS

"U.S. Appl. No. 14/704,212, Response filed Mar. 4, 2016 to Non Final Office Action dated Dec. 4, 2015", 11 pgs.
"U.S. Appl. No. 14/738,069, Non Final Office Action dated Mar. 21, 2016", 12 pgs.
"U.S. Appl. No. 14/738,069, Notice of Allowance dated Aug. 17, 2016", 6 pgs.
"U.S. Appl. No. 14/738,069, Response filed Jun. 10, 2016 to Non Final Office Action dated Mar. 21, 2016", 10 pgs.
"U.S. Appl. No. 14/808,283, Notice of Allowance dated Apr. 12, 2016", 9 pgs.
"U.S. Appl. No. 14/808,283, Notice of Allowance dated Jul. 14, 2016", 8 pgs.
"U.S. Appl. No. 14/808,283, Preliminary Amendment filed Jul. 24, 2015", 8 pgs.
"U.S. Appl. No. 14/841,987, Notice of Allowance dated Mar. 29, 2017", 17 pgs.
"U.S. Appl. No. 14/841,987, Notice of Allowance dated Aug. 7, 2017", 8 pgs.
"U.S. Appl. No. 14/967,472, Final Office Action dated Mar. 10, 2017", 15 pgs.
"U.S. Appl. No. 14/967,472, Non Final Office Action dated Sep. 8, 2016", 11 pgs.
"U.S. Appl. No. 14/967,472, Preliminary Amendment filed Dec. 15, 2015", 6 pgs.
"U.S. Appl. No. 14/967,472, Response filed Dec. 5, 2016 to Non Final Office Action dated Sep. 8, 2016", 11 pgs.
"U.S. Appl. No. 15/137,608, Preliminary Amendment filed Apr. 26, 2016", 6 pgs.
"U.S. Appl. No. 15/152,975, Non Final Office Action dated Jan. 12, 2017", 36 pgs.
"U.S. Appl. No. 15/152,975, Preliminary Amendment filed May 19, 2016", 8 pgs.
"U.S. Appl. No. 15/208,460, Notice of Allowance dated Feb. 27, 2017", 8 pgs.
"U.S. Appl. No. 15/208,460, Notice of Allowance dated Dec. 30, 2016", 9 pgs.
"U.S. Appl. No. 15/208,460, Supplemental Preliminary Amendment filed Jul. 18, 2016", 8 pgs.
"U.S. Appl. No. 15/224,262, Notice of Allowance dated Mar. 2, 2017", 14 pgs.
"U.S. Appl. No. 15/224,312, Preliminary Amendment filed Feb. 1, 2017", 11 pgs.
"U.S. Appl. No. 15/224,343, Preliminary Amendment filed Jan. 31, 2017", 10 pgs.
"U.S. Appl. No. 15/224,355, Preliminary Amendment filed Apr. 3, 2017", 12 pgs.
"U.S. Appl. No. 15/224,372, Preliminary Amendment filed May 5, 2017", 10 pgs.
"U.S. Appl. No. 15/224.359, Preliminary Amendment filed Apr. 19, 2017", 8 pgs.
"U.S. Appl. No. 15/298,806, Non Final Office Action dated Jun. 12, 2017", 26 pgs.
"U.S. Appl. No. 15/298,806, Preliminary Amendment filed Oct. 21, 2016", 8 pgs.
"U.S. Appl. No. 15/298,806, Response filed Sep. 12, 2017 to Non Final Office Action dated Jun. 12, 2017", 12 pgs.
"U.S. Appl. No. 15/416,846, Preliminary Amendment filed Feb. 18, 2017", 10 pgs.
"U.S. Appl. No. 15/486,111, Corrected Notice of Allowance dated Sep. 7, 2017", 3 pgs.
"U.S. Appl. No. 15/486,111, Non Final Office Action dated May 9, 2017", 17 pgs.
"U.S. Appl. No. 15/486,111, Notice of Allowance dated Aug. 30, 2017", 5 pgs.
"U.S. Appl. No. 15/486,111, Response filed Aug. 9, 2017 to Non Final Office Action dated May 9, 2017", 11 pgs.
"U.S. Appl. No. 15/837,935, Notice of Allowance dated Nov. 25, 2019", 18 pgs.

"BlogStomp", StompSoftware, [Online] Retrieved from the internet: <URL: http://stompsoftware.com/blogstomp>, (accessed May 24, 2017), 12 pgs.
"Canadian Application Serial No. 2,894,332 Response filed Jan. 24, 2017 to Office Action dated Aug. 16, 2016", 15 pgs.
"Canadian Application Serial No. 2,894,332, Office Action dated Aug. 16, 2016", 4 pgs.
"Canadian Application Serial No. 2,910,158, Office Action dated Dec. 15, 2016", 5 pgs.
"Canadian Application Serial No. 2,910,158, Response filed Apr. 11, 2017 to Office Action dated Dec. 15, 2016", 21 pgs.
"Cup Magic Starbucks Holiday Red Cups come to life with AR app", Blast Radius, [Online] Retrieved from the internet: <URL: https://web.archive.org/web/20160711202454/http://www.blastradius.com/work/cup-magic>, (2016), 7 pgs.
"Daily App: InstaPiace (iOS/Android): Give Pictures a Sense of Place", TechPP, [Online] Retrieved from the internet: <URL: http://techpp.com/2013/02/15/instaplace-app-review>, (2013), 13 pgs.
"How Snaps Are Stored And Deleted", Snapchat, [Online] Retrieved from the Internet: <URL: https://www.snap.com/en-US/news/post/how-snaps-are-stored-and-deleted/>, (May 9, 2013), 2 pgs.
"InstaPlace Photo App Tell The Whole Story", [Online] Retrieved from the internet: <URL: https://youtu.be/uF_gFkg1hBM>, (Nov. 8, 2013), 113 pgs, 1:02 min.
"International Application Serial No. PCT/EP2008/063682, International Search Report dated Nov. 24, 2008", 3 pgs.
"International Application Serial No. PCT/US2014/040346, International Search Report dated Mar. 23, 2015", 2 pgs.
"International Application Serial No. PCT/US2014/040346, Written Opinion dated Mar. 23, 2015", 6 pgs.
"International Application Serial No. PCT/US2015/035591, International Preliminary Report on Patentability dated Dec. 22, 2016", 7 pgs.
"International Application Serial No. PCT/US2015/035591, International Search Report dated Aug. 11, 2015", 5 pgs.
"International Application Serial No. PCT/US2015/035591, International Written Opinion dated Aug. 11, 2015", 5 pgs.
"International Application Serial No. PCT/US2015/037251, International Search Report dated Sep. 29, 2015", 2 pgs.
"International Application Serial No. PCT/US2015/050424, International Search Report dated Dec. 4, 2015", 2 pgs.
"International Application Serial No. PCT/US2015/050424, Written Opinion dated Dec. 4, 2015", 10 pgs.
"International Application Serial No. PCT/US2015/053811, International Preliminary Report on Patentability dated Apr. 13, 2017", 9 pgs.
"International Application Serial No. PCT/US2015/053811, International Search Report dated Nov. 23, 2015", 5 pgs.
"International Application Serial No. PCT/US2015/053811, Written Opinion dated Nov. 23, 2015", 8 pgs.
"International Application Serial No. PCT/US2015/056884, International Preliminary Report on Patentability dated May 4, 2017", 8 pgs.
"International Application Serial No. PCT/US2015/056884, International Search Report dated Dec. 22, 2015", 5 pgs.
"International Application Serial No. PCT/US2015/056884, Written Opinion dated Dec. 22, 2015", 6 pgs.
"International Application Serial No. PCT/US2015/065785, International Search Report dated Jul. 21, 2016", 5 pgs.
"International Application Serial No. PCT/US2015/065785, Written Opinion dated Jul. 21, 2016", 5 pgs.
"International Application Serial No. PCT/US2015/065821, International Search Report dated Mar. 3, 2016", 2 pgs.
"International Application Serial No. PCT/US2015/065821, Written Opinion dated Mar. 3, 2016", 3 pgs.
"International Application Serial No. PCT/US2016/023085, International Preliminary Report on Patentability dated Sep. 28, 2017", 8 pgs.
"International Application Serial No. PCT/US2016/023085, International Search Report dated Jun. 17, 2016", 5 pgs.
"International Application Serial No. PCT/US2016/023085, Written Opinion dated Jun. 17, 2016", 6 pgs.

(56) References Cited

OTHER PUBLICATIONS

"Introducing Snapchat Stories", [Online] Retrieved from the internet: <URL: https://web.archive.org/web/20131026084921/https://www.youtube.com/watch?v=88Cu3yN-LIM>, (Oct. 3, 2013), 92 pgs; 00:47 min.
"IVisit Mobile: Getting Started", IVisit, [Online] Retrieved from the Internet: <URL: http://web.archive.org/web/20140830174355/http://ivisit.com/support_mobile>, (Dec. 4, 2013), 16 pgs.
"Macy's Believe-o-Magic", [Online] Retrieved from the internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the internet: <URL: https://www.businesswire.com/news/home/20111102006759/en/Macys-Introduces-Augmented-Reality-Experience-Stores-Country>, (Nov. 2, 2011), 6 pgs.
"Pluraleyes by Red Giant", © 2002-2015 Red Giant LLC, [Online]. Retrieved from the Internet: <URL: http://www.redgiant.com/products/pluraleyes/, (Accessed Nov. 11, 2015), 5 pgs.
"Starbucks Cup Magic", [Online] Retrieved from the internet: <URL: https://www.youtube.com/watch?v=RWwQXi9RG0w>, (Nov. 8, 2011), 87 pgs.; 00:47 min.
"Starbucks Cup Magic for Valentine's Day", [Online] Retrieved from the internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the internet: <URL: http://www.businesswire.com/news/home/20111115005744/en/Starbucks-Holiday-Red-Cups-Life-Signaling-Return>, (Nov. 15, 2011), 5 pgs.
Carthy, Roi, "Dear All Photo Apps: Mobil Just Won Filters", TechCrunch, [Online] Retrieved from the internet: <URL: https://techcrunch.com/2011/09/08/mobli-filters>, (Sep. 8, 2011), 10 pgs.
Castelluccia, Claude, et al., "EphPub: Toward robust Ephemeral Publishing", 19th IEEE International Conference on Network Protocols (ICNP), (Oct. 17, 2011), 18 pgs.
Clarke, Tangier, "Automatically syncing multiple clips and lots of audio like PluralEyes possible?", [Online], Retrieved from the Internet: <URL: https://forums.creativecow.net/thread/344/20553, (May 21, 2013), 8 pgs.
Janthong, Isaranu, "Instaplace ready on Android Google Play store", Android App Review Thailand, [Online] Retrieved from the internet: <URL: http://www.android-free-app-review.com/2013/01/instaplace-android-google-play-store.html>, (Jan. 23, 2013), 9 pgs.
Leyden, John, "This SMS will self-destruct in 40 seconds", [Online] Retrieved from the internet: <URL: http://www.theregister.co.uk/2005/12/12/stealthtext/>, (Dec. 12, 2005), 1 pg.
MacLeod, Duncan, "Macys Beiieve-o-Magic App", [Online] Retrieved from the internet: <URL: http://theinspirationroom.com/daily/2011/macys-believe-o-magic-app>, (Nov. 14, 2011), 10 pgs.
MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Melanson, Mike, "This text message will self destruct in 60 seconds", [Online] Retrieved from the internet: <URL: http://readwrite.com/2011/02/11/this_text_message_will_self_destruct_in_60_seconds>, (Feb. 18, 2015), 4 pgs.
Notopoulos, Katie, "A Guide To The New Snapchat Filters And Big Fonts", [Online] Retrieved from the internet: <URL: https://www.buzzfeed.com/katienotopoulos/a-guide-to-the-new-snapchat-filters-and-big-fonts?utm_term-.bkQ9qVZWe#.nv58YXpkV>, (Dec. 22, 2013), 13 pgs.
Panzarino, Matthew, "Snapchat Adds Filters, A Replay Function And For Whatever Reason, Time, Temperature And Speed Overlays", TechCrunch, [Online] Retrieved form the internet: <URL: https://techcrunch.com/2013/12/20/snapchat-adds-filters-new-font-and-for-some-reason-time-temperature-and-speed-overlays/>, (Dec. 20, 2013), 12 pgs.
Sawers, Paul, "Snapchat for iOS Lets You Send Photos to Friends and Set How long They're Visible For", [Online] Retrieved from the internet; <URL: https://thenextweb.com/apps/2012/05/07/snapchat-for-ios-lets-you-send-photos-to-friends-and-set-how-long-theyre-visible-for/>, (May 7, 2012), 5 pgs.
Shein, Esther, "Ephemeral Data", Communications of the ACM, vol. 56, No. 9, (Sep. 2013), 3 pgs.
Trice, Andrew, "My Favorite New Feature: Multi-Clip Sync in Premiere Pro CC", [Online]. Retrieved from the Internet: <URL: http://www.tricedesigns.com/2013/06/18/my-favorite-new-feature-multi-cam-synch-in-premiere-pro-cc/, (Jun. 18, 2013), 5 pgs.
Tripathi, Rohit, "Watermark Images in PHP And Save File on Server", [Online] Retrieved from the internet: <URL: http://code.rohitink.com/2012/12/28/watermark-images-in-php-and-save-file-on-server>, (Dec. 28, 2012), 4 pgs.
"U.S. Appl. No. 14/494,226, Appeal Decision mailed Feb. 26, 2021", 8 pgs.
"U.S. Appl. No. 14/494,226, Notice of Allowance dated Jun. 9, 2021", 7 pgs.

* cited by examiner

US 11,190,679 B2

ACCESSING MEDIA AT A GEOGRAPHIC LOCATION

CROSS-REFERENCE TO RELATED APPLICATIONS

This Application is a continuation of and claims the benefit of priority to U.S. patent application Ser. No. 15/837,935, filed Dec. 11, 2017, which is a continuation of and claims the benefit of priority to U.S. patent application Ser. No. 14/841,987, filed Sep. 1, 2015, which is a continuation of and claims the benefit of priority to U.S. patent application Ser. No. 14/682,259, filed Apr. 9, 2015, which is a continuation of and claims the benefit of priority to U.S. patent application Ser. No. 14/539,391, filed Nov. 12, 2014, each of which is hereby incorporated herein by reference in their entireties.

TECHNICAL HELD

The subject matter disclosed herein generally relates to user interface technology. Specifically, the present disclosure addresses systems and methods that provide a user interface for accessing media on a mobile device.

BACKGROUND

There has been an unprecedented boom in the popularity of amateur photography sparked by the widespread adoption of mobile technology, mobile phones in particular, that incorporates cameras. In fact, mobile phone manufacturers have supplanted traditional camera companies as the world's largest producers of cameras. Software development companies have responded to this boom by creating photographic applications that allow users of mobile phones to manipulate and view photographs in creative ways. Such photographic applications may allow a user to view digital photographs taken within a specific time period (e.g., recently taken photographs, or photographs taken in a specific month or year). However, if the user wishes to view a photograph previously taken at a particular geographic location (e.g., Venice Beach, Calif.), the user may be required to tediously scroll through a large number of photographs.

BRIEF DESCRIPTION OF THE DRAWINGS

The present disclosure is illustrated by way of example, and not by way of limitation, in the figures of the accompanying drawings, in which.

DETAILED DESCRIPTION

Figure 1:
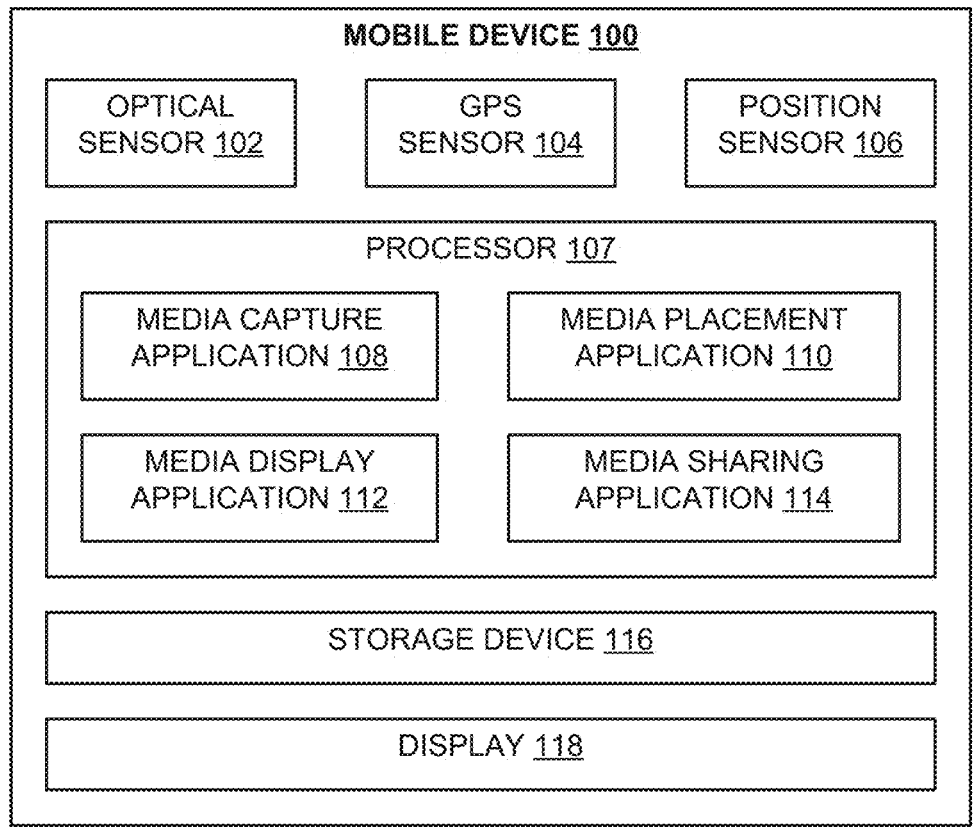
FIG. 1 shows a block diagram illustrating one example embodiment of a mobile device.

Although the present disclosure is described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

In one example embodiment, a user of a mobile device (e.g., mobile phone) selects pictures that have already been taken with the mobile device. The mobile device places each selected picture on a geographic map to identify the geographic locations (also referred to as geolocations) where the pictures were taken. The mobile device monitors its own geolocation. When the mobile device detects that its location corresponds to a spot where a stored picture was previously captured, the mobile device displays the stored picture. For example, the user may take a picture of a sunset at Venice Beach on his mobile device and may select the picture of the sunset from a photographic application for placement. When the user later visits the same location in Venice Beach where the previously taken picture of the sunset was captured, that previously taken picture appears on the display of the mobile device (e.g., when the mobile device is held up by the user).

In another example embodiment, the mobile device generates a notification to the user when the mobile device detects that it is located at a spot where a stored picture was previously taken. The notification informs the user that the stored picture previously taken from the same spot is available for viewing. The notification further includes instructions to raise the mobile device to view the stored picture. The mobile device detects its position in space and displays the stored picture when the position of the mobile device coincides (e.g., within a threshold tolerance) with the position of the mobile device when the stored picture was originally captured. For example, the mobile device displays the stored picture when the mobile device is raised and pointed in about the same direction that the mobile device was pointed when the stored picture was captured. In another example, the mobile device displays visual guides, such as an arrow, to instruct the user of the mobile device in which direction to point the mobile device to access and view the stored picture.

In another example embodiment, the mobile device can share a picture with another mobile device (e.g., a receiving mobile device). The receiving mobile device displays the shared picture when the receiving mobile device is located at the point at which the shared picture was captured. Similarly, the receiving mobile device generates a notification when it detects that it is located at that same point at which the shared picture was captured. The notification informs the user of the receiving mobile device that the shared pictures are available for viewing. The notification instructs the user to raise the receiving mobile device to view the shared picture. In another example, the receiving mobile device instructs the user to go to the spot where the shared picture was captured to access and view the shared picture.

In another example embodiment, the user of the mobile device selects a picture previously taken with the mobile device and associates it with other geolocations, in addition to the geolocation at which the picture was captured, but virtually placing the picture at these other geolocations. Accordingly, when the mobile device detects that it is located at one of the other geolocations, the mobile device displays the picture. For example, the user may select a picture of the Santa Monica Pier taken in Santa Monica, and the user may virtually place the selected picture on Huntington Beach Pier in a map. When the user of the mobile device later visits Huntington Beach Pier and holds his mobile device up, a picture of Santa Monica Pier appears on the display of the mobile device. The user can then view and compare the actual Huntington Beach Pier with the previously taken picture of Santa Monica Pier. In another example, the user may select pictures taken at Yosemite National Park and virtually place them in other National Parks on a map. When the user later visits these other National Parks, the pictures taken at Yosemite National Park may be presented in the mobile device of the user. The user can then easily access and view his old pictures that are relevant to National Parks without having to browse through a multitude of pictures in the photo viewing application of his mobile device when the user is at one of the other National Parks.

Various examples of a media placement application, a media display application, and a media sharing application in the mobile device are described. The media placement application operates at the mobile device and associates pictures and videos with corresponding geolocations where the media was generated. The media display application operates at the mobile device and generates a display of the picture or video corresponding to a geolocation where the mobile device is currently located. The media sharing application operates at the mobile device and generates a message to another mobile device to enable viewing of a shared picture when the other mobile device is located at a geolocation associated with the shared picture. The message may include a shared picture and corresponding geolocation information. In another embodiment, the media placement application, media display application, and media sharing application operate with a server.

FIG. 1 shows a block diagram illustrating one example embodiment of a mobile device 100. The mobile device 100 includes an optical sensor 102, a Global Positioning System (GPS) sensor 104, a position sensor 106, a processor 107, a storage device 116, and a display 118.

The optical sensor 102 includes an image sensor, such as, a charge-coupled device. The optical sensor 102 captures visual media. The optical sensor 102 can be used to media items such as pictures and videos.

The GPS sensor 104 determines the geolocation of the mobile device 100 and generates geolocation information (e.g., coordinates). In another embodiment, other sensors may be used to detect a geolocation of the mobile device 100. For example, a WiFi sensor or Bluetooth sensor can be used to determine the geolocation of the mobile device 100.

The position sensor 106 measures a physical position of the mobile device relative to a frame of reference. The frame of reference may be the magnetic North Pole. For example, the position sensor 106 may include a geomagnetic field sensor to determine the direction in which the optical sensor 102 of the mobile device is pointed (e.g., West) and an orientation sensor to determine the orientation of the mobile device (e.g., raised, lowered, or levelled). In another example, the position module 206 generates an azimuth angle and an elevation angle to identify the relative position of the mobile device 100 in space. For example, an azimuth angle of 0 degrees indicates that the optical sensor 102 is pointed at Magnetic North. An elevation of 0 degrees indicates that the optical sensor 102 is pointed to the horizon.

The processor 107 may be a central processing unit that includes a media capture application 108, a media placement application 110, a media display application 112, and a media sharing application 114.

The media capture application 108 includes executable instructions to generate media items such as pictures and videos using the optical sensor 102. The media capture application 108 also associates a media item with the geolocation and the position of the mobile device 100 at the time the media item is generated using the GPS sensor 104 and the position sensor 106.

The media placement application 110 includes executable instructions to enable a user of the mobile device 100 to select and place the media items on a geographic map.

The media display application 112 includes executable instructions to determine whether the geolocation of the mobile device 100 corresponds to the geolocation of one of the media item selected with the media placement application 110. The media display application 112 displays the corresponding media item in the display 118 when the mobile device 100 is at the geolocation where the media item was previously generated.

The media sharing application 114 includes executable instructions to generate a message to another mobile device to share a media item. The mobile device of the recipient can view the shared media item when the mobile device of the recipient is at the geolocation where the shared media item was previously generated with the mobile device of the sender.

The storage device 116 includes a memory that may be or include flash memory, random access memory, any other type of memory accessible by the processor 107, or any suitable combination thereof. The storage device 116 stores the media items selected by the user for placement and also stores the corresponding geolocation information. The storage device 116 also stores executable instructions corresponding to the media capture application 108, the media placement application 110, the media display application 112, and the media sharing application 114.

The display 118 includes, for example, a touch screen display. The display 118 displays the media items generated by the media capture application 108. A user selects media items for placement by touching the corresponding media items on the display 118. A touch controller monitors signals applied to the display 118 to coordinate the selection of the media items.

The mobile device 100 also includes a transceiver that interfaces with an antenna. The transceiver may be configured to both transmit and receive cellular network signals, wireless data signals, or other types of signals via the antenna, depending on the nature of the mobile device 100. Further, in some configurations, the GPS sensor 104 may also make use of the antenna to receive GPS signals.

Figure 2:
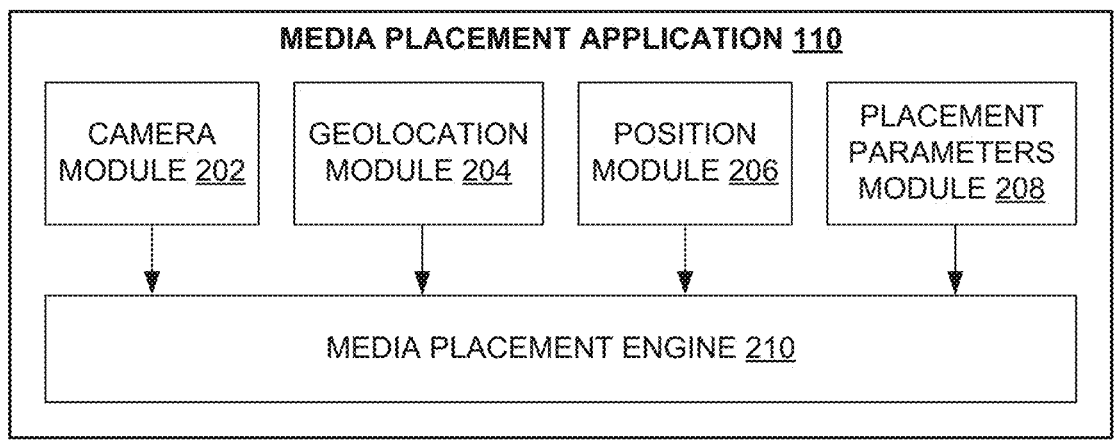
FIG. 2 shows a block diagram illustrating one example embodiment of a media placement application.

FIG. 2 shows a block diagram illustrating one example embodiment of a media placement application 110. The media placement application 110 includes a camera module 202, a geolocation module 204, a position module 206, a placement parameters module 208, and a media placement engine 210.

The camera module 202 communicates with the media capture application 108 to access the media items generated at the mobile device 100. In one example, the camera module 202 accesses the media items selected for placement by the user of the mobile device 100. In another example, the camera module 202 accesses media items generated from other mobile devices.

The geolocation module 204 communicates with the GPS sensor 104 to access geolocation information of the corresponding media items selected by the user. The geolocation information may include GPS coordinates of the mobile device 100 when the mobile device 100 generated the media items. In another example, the geolocation information may include GPS coordinates corresponding to the geolocation where the media items were generated using other mobile devices.

The position module 206 communicates with the position sensor 106 to access direction information and position information of the mobile device 110 at the time the mobile device 100 generated the media item. The direction information may include a direction (e.g., North, South, East, West, or other azimuth angle) in which the mobile device 100 was pointed when the mobile device 100 generated the media item. The orientation information may identify an orientation (e.g., high above the horizon, low towards the ground, or other elevation angle) at which the mobile device 100 was pointed when the mobile device 100 generated the media item.

The placement parameters module 208 accesses predefined ranges for the geolocation information, direction information, and position information. The predefined ranges identify a range for each parameter (e.g., geolocation, direction, and position). For example, a geolocation range for the geolocation information may be 100 feet. A direction range for the direction information may be 45 degrees. A position range for the position information may be 30 degrees. These ranges may be set by default or may be adjusted by the user of the mobile device 100.

The media placement engine 210 accesses the predefined ranges from the placement parameters module 208 to define access conditions for the media items. The user of the mobile device 100 can view the selected media items when the access conditions are met. For example, the media placement engine 210 receives a selection of media items from the user of the mobile device 100. The user may use the touchscreen of the display 118 to select media items for placement. The media placement engine 210 accesses the selected media items from the camera module 202, the geolocation information for the selected media items from the geolocation module 204, the direction and position information associated with the selected media items from the position module 206, and the predefined ranges from placement parameters module 208. The media placement engine 210 applies the predefined ranges to the geolocation information, the direction information, and the position information for the selected media items to generate corresponding boundaries for the selected media items. The access conditions are based on the boundaries for the selected media items.

The boundaries may include a geolocation boundary, a direction boundary, and a position boundary for a corresponding selected media item. For example, the geolocation boundary may include an area within 100 feet of the GPS coordinates of the mobile device 100 when the selected media item was generated at the mobile device 100. The direction boundary may include a direction between South East and South West based on the mobile device 100 being pointed South when the selected media item was generated at the mobile device 100 and based on a predefined direction range of 45 degrees. The position boundary may identify a position range from −30 degrees to 30 degrees based on the mobile device 100 being held up at a horizontal level when the selected media item was generated at the mobile device 100. The boundaries may be used later to determine which selected media item to display based on a current geolocation and position of the mobile device 100.

Figure 3:
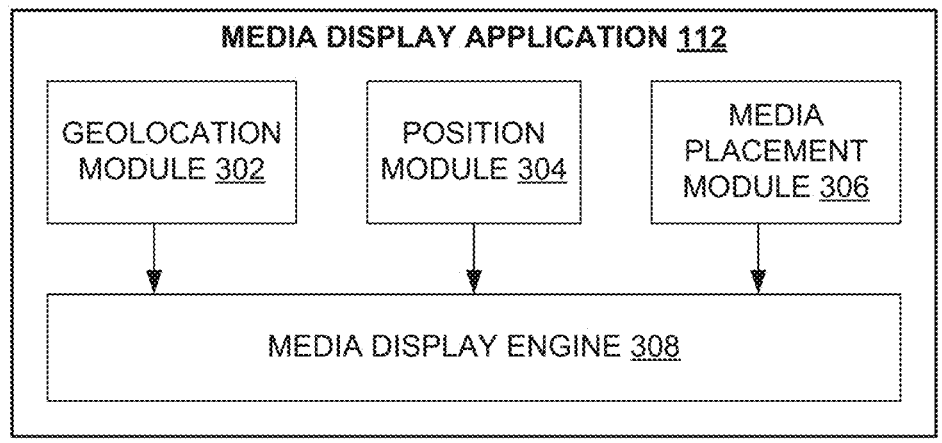
FIG. 3 shows a block diagram illustrating one example embodiment of a media display application.

FIG. 3 shows a block diagram illustrating one example embodiment of the media display application 112. The media display application 112 includes a geolocation module 302, a position module 304, a media placement module 306, and a media display engine 308.

The geolocation module 302 communicates with the GPS sensor 104 to access an updated or a current geolocation of the mobile device 100. The geolocation information may include updated GPS coordinates of the mobile device 100. In one example, the geolocation module 302 periodically accesses the geolocation information every minute. In another example, the geolocation module 302 may dynamically access the geolocation information based on other usage (e.g., every time the mobile device 100 is held up or is used by the user).

The position module 304 communicates with the position sensor 106 to access direction information and position information of the mobile device 100. The direction information may include a direction in which the mobile device 100 is currently pointed. The position information may identify an orientation in which the mobile device 100 is currently held.

The media placement module 306 communicates with the media placement engine 210 to determine the boundaries corresponding to the selected media items. For example, the boundaries for a media item may include a zip code boundary and a direction boundary (e.g., North).

The media display engine 308 accesses the current geolocation of the mobile device 100, the current direction and position of the mobile device 100, and the corresponding boundaries for the selected media items. The media display engine 308 compares the current geolocation, direction, and position of the mobile device 100 with the corresponding boundaries for the selected media items. If the media display engine 308 determines that the current geolocation, direction, and position the mobile device 100 are within the boundaries of a selected media item, the media display engine 308 displays the selected media item in the display 118.

In another example, if the media display engine 308 determines that any combination of the current geolocation, direction, and position of the mobile device 100 is within a corresponding boundary of a selected media item, the media display engine 308 displays the selected media item in the display 118. For example, the media display engine 308 displays the selected media item when the media display engine 308 determines that a current geolocation of the mobile device 100 is within a geolocation boundary of a selected media item regardless of a current direction and position of the mobile device 100.

In another example, once the media display engine 308 determines that a current geolocation of the mobile device 100 is within a geolocation boundary of a selected media item regardless of a current direction and position of the mobile device 100, the media display engine 308 generates a notification. The media display engine 308 causes the notification to be displayed in the display 118. The notification informs the user of the mobile device 100 that the selected media item is available for viewing at the current geolocation of the mobile device 100. The media display engine 308 then determines whether the direction and position of the mobile device 100 are within corresponding boundaries of the selected media item. The media display engine 308 displays the selected media item in the display 118 once the direction and position of the mobile device 100 are within the direction and position boundaries of the selected media item.

In yet another example, the media display engine 308 generates a visual guide, such as an arrow, in the display of the mobile device 100 to guide and direct the user of the mobile device 100 to position the mobile device 100 in the direction and position associated with the selected media item. For example, the mobile device 100 may display a right arrow to instruct the user to move and point the mobile device 100 further to the right. The media display engine 308 adjusts the display position of the selected media item relative to the display of the mobile device 100 based on the position of the mobile device 100 relative to the position boundary for the selected media item.

Figure 4:
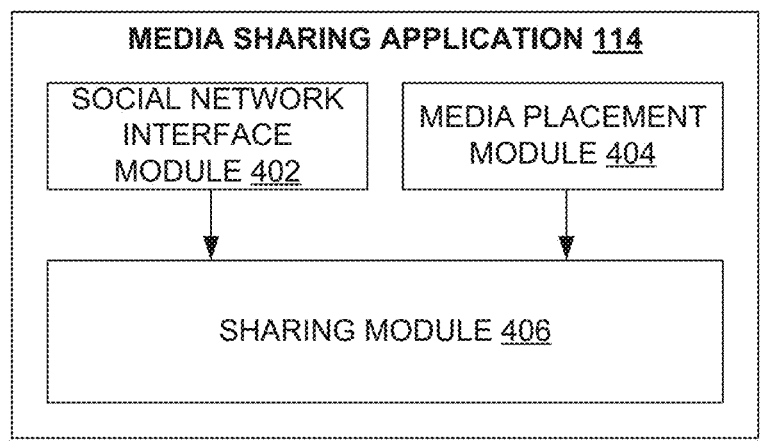
FIG. 4 shows a block diagram illustrating one example embodiment of a media sharing application.

FIG. 4 shows a block diagram illustrating one example embodiment of the media sharing application 114. The media sharing application 114 includes a social network interface module 402, a media placement module 404, and a sharing module 406.

The social network interface module 402 accesses a server of a social network service provider to access contact information of social network contacts of the user of the mobile device 100. In another example, the social network interface module 402 accesses an address book stored in the mobile device 100.

The media placement module 404 communicates with the media placement engine 210 to determine the boundaries corresponding to the selected media items. The media placement module 404 retrieves the media items selected by the user of the mobile device 100. The media placement module 404 also retrieves access conditions (e.g., boundaries) for the media items selected by the user of the mobile device 100. By way of example, the sharing module 406 communicates the selected media item and the access conditions of the selected media item to a second mobile device. The second mobile device monitors a combination of its geolocation and position. The second mobile device determines whether its geolocation or position meet the access conditions of the selected media item. If the second mobile device meets the access conditions, the second mobile device generates a notification of the availability to view the selected media item in a display of the second mobile device.

In another example, the second mobile device generates a first notification identifying a requested geolocation to access the selected media item. For example, the notification may be "You have received a photo. Please go to Venice Beach to view it." The second mobile device monitors its geolocation and determines whether its geolocation meets the access conditions of the selected media item. In this example, the second mobile device determines whether it is located in Venice Beach. If the access conditions are met, the second mobile device generates a second notification of the availability to view the selected media item in the display of the second mobile device.

Figure 5:
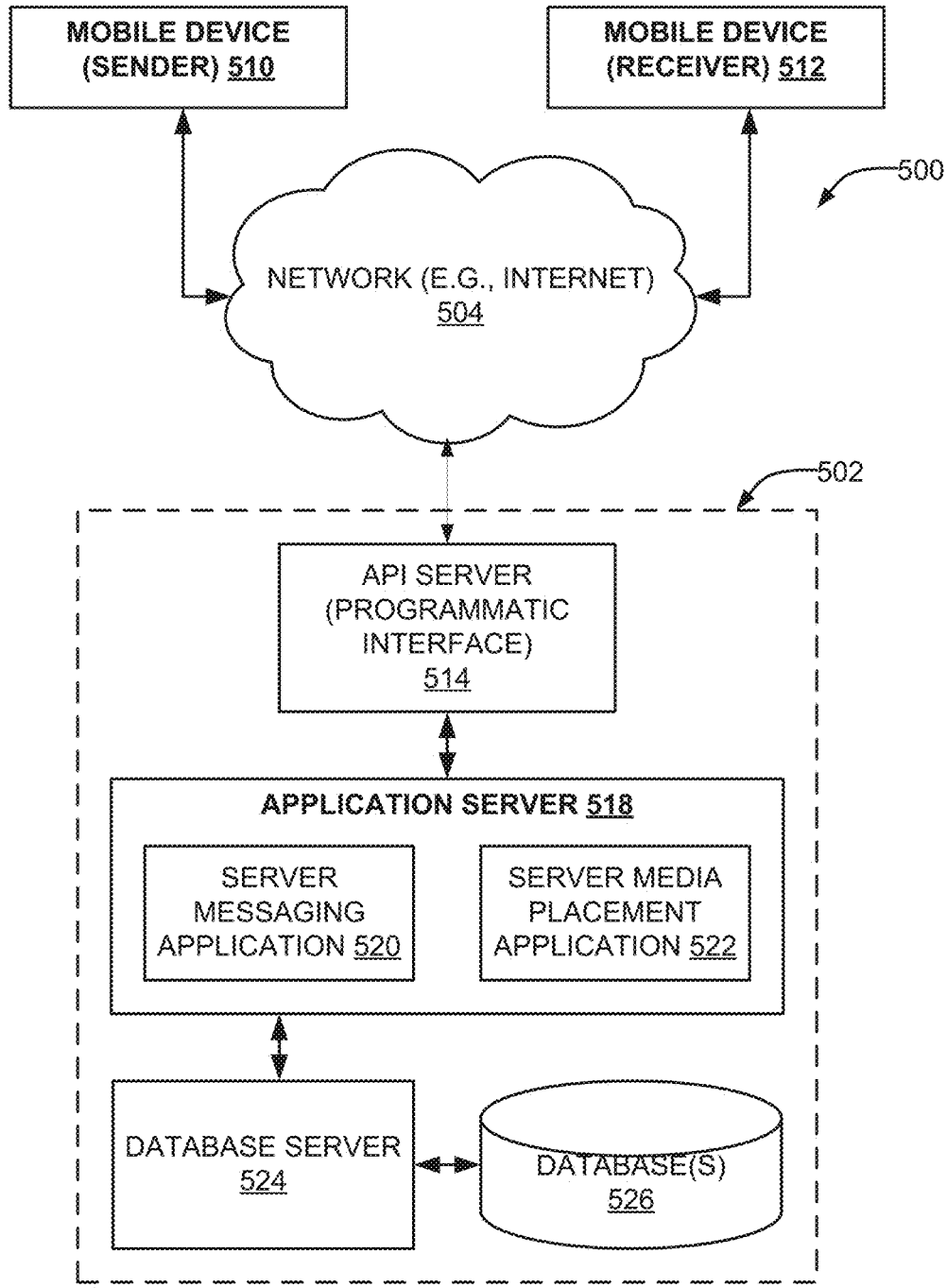
FIG. 5 is a network diagram depicting a network system having a client-server architecture configured for exchanging data over a network, according to one embodiment.

FIG. 5 is a network diagram depicting a network system 500 having a client-server architecture configured for exchanging data over a network, according to one embodiment. For example, the network system 500 may be a messaging system where clients may communicate and exchange data within the network system 500. The data may pertain to various functions (e.g., sending and receiving text and media communication, media items, and access conditions) and aspects (e.g., placement of media items, identification and retrieval of media items) associated with the network system 500 and its users. Although illustrated herein as a client-server architecture, other embodiments may include other network architectures, such as peer-to-peer or distributed network environments.

A data exchange platform, in an example, includes a server messaging application 520 and a server media placement application 522, and may provide server-side functionality via a network 504 (e.g., the Internet) to one or more clients. The one or more clients may include users that utilize the network system 500 and, more specifically, the server messaging application 520 and the server media placement application 522, to exchange data over the network 504. These operations may include transmitting, receiving (communicating), and processing data to, from, and regarding content and users of the network system 500. The data may include, but is not limited to, content and user data such as user profiles, messaging content, messaging attributes, media attributes, client device information, geolocation information, placement parameters, access conditions, and social network information, among others.

In various embodiments, the data exchanges within the network system 500 may be dependent upon user-selected functions available through one or more client or user interfaces (UIs). The UIs may be associated with a client machine, such as mobile devices 510, 512. The mobile devices 510 and 512 may be in communication with the server messaging application 520 and server media placement application 522 via an application server 518. The mobile devices 510, 512 include wireless communication components, and audio and optical components for capturing various forms of media including photos and videos as previously described with respect to FIG. 1.

Turning specifically to the server messaging application 520 and the server media placement application 522, an application program interface (API) server 514 is coupled to, and provides programmatic interface to the application server 518. The application server 518 hosts the server messaging application 520 and the server media placement application 522. The application server 518 is, in turn, shown to be coupled to one or more database servers 524 that facilitate access to one or more databases 526.

The API server 514 communicates and receives data pertaining to messages, media items, and access conditions, among other things, via various user input tools. For example, the API server 514 may send and receive data to and from an application running on another client machine (e.g., mobile devices 510, 512 or a third party server).

The server messaging application 520 provides messaging mechanisms for users of the mobile devices 510, 512 to send messages that include text and media content such as pictures and video and access conditions. The mobile devices 510, 512 can access and view the messages from the server messaging application 520. The server messaging application 520 may utilize any one of a number of message delivery networks and platforms to deliver messages to users. For example, the messaging application 120 may deliver messages using electronic mail (e-mail), instant message (IM), Short Message Service (SMS), text, facsimile, or voice (e.g., Voice over IP (VoIP)) messages via wired (e.g., the Internet), plain old telephone service (POTS), or wireless networks (e.g., mobile, cellular, WiFi, Long Term Evolution (LTE), Bluetooth).

The server media placement application 522 provides a system and a method for placing media items at select geolocations and enabling access to the media items when the mobile devices 510, 512 are located at the select geolocations. The server media placement application 522 provides a Graphical User Interface (GUI) that accesses pictures taken with the mobile device 510, and receives a selection of the pictures from the user of the mobile device 510. The server media placement application 522 associates the selected pictures with access conditions. When the server media placement application 522 detects that the geolocation and position of the mobile device 510 matches the geolocation and access conditions of the selected pictures, the server media placement application 522 causes the mobile device 510 to display the selected pictures. In one example embodiment, the server media placement application 522 may include components similar to the media, placement application 110, the media display application 112, and the media sharing application 114.

Figure 6:
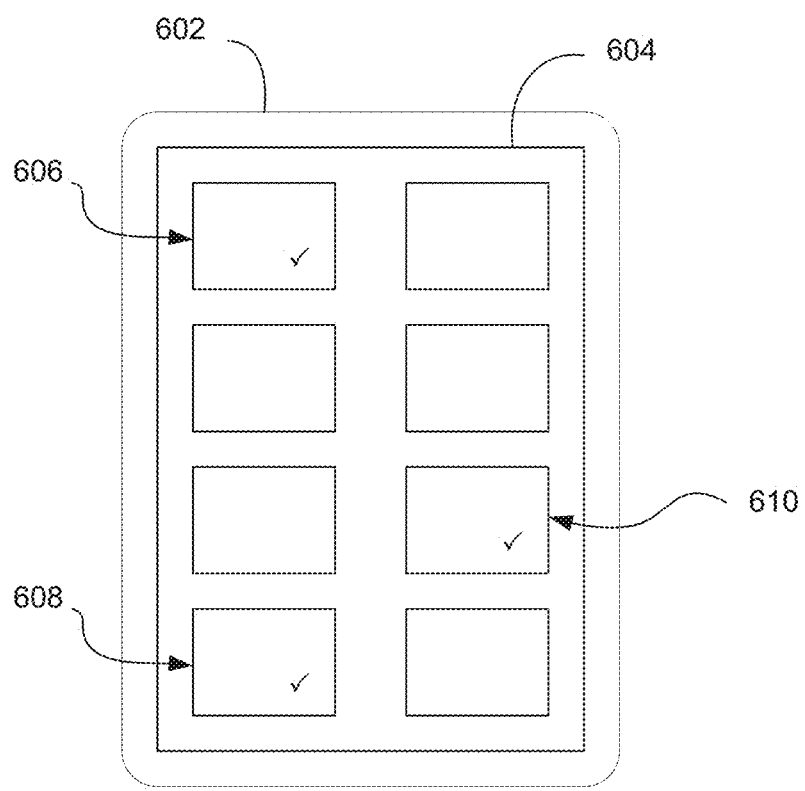
FIG. 6 shows an example of a graphical user interface to select media items.

FIG. 6 shows an example of a graphical user interface (GUI) for a user to select pictures for placement. A mobile device 602 includes a touchscreen display 604 that shows a gallery of pictures. The user selects pictures 606, 608, and 610 for placement and notification by tapping the touchscreen display 604 on top of the picture 606, 608, and 610. The mobile device 602 displays the corresponding selected pictures in the display 604 when the geolocation of the mobile device 602 later satisfies the access conditions.

Figure 7A:
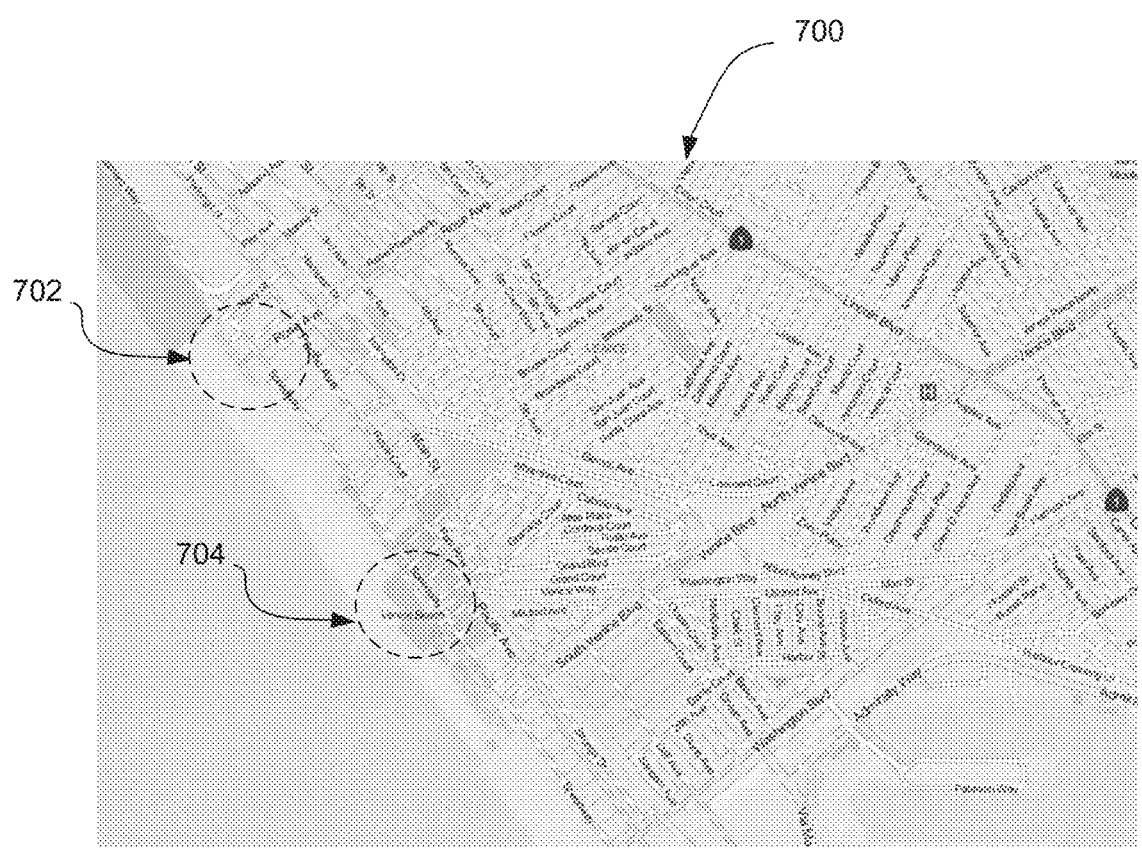
FIG. 7A shows an example of a graphical user interface illustrating geolocations of media items on a map.

FIG. 7A shows an example of GUI for a user to select pictures for placement in a map 700. The map 700 illustrates geolocations boundaries of selected media items. The map 700 includes geolocation boundaries 702 and 704. Each geolocation boundary is associated with one or more media items previously, selected by the user of the mobile device 602. For example, pictures 606 and 608 may have been generated in geolocation boundary 702. Picture 610 may have been generated in geolocation boundary 704.

Figure 7B:
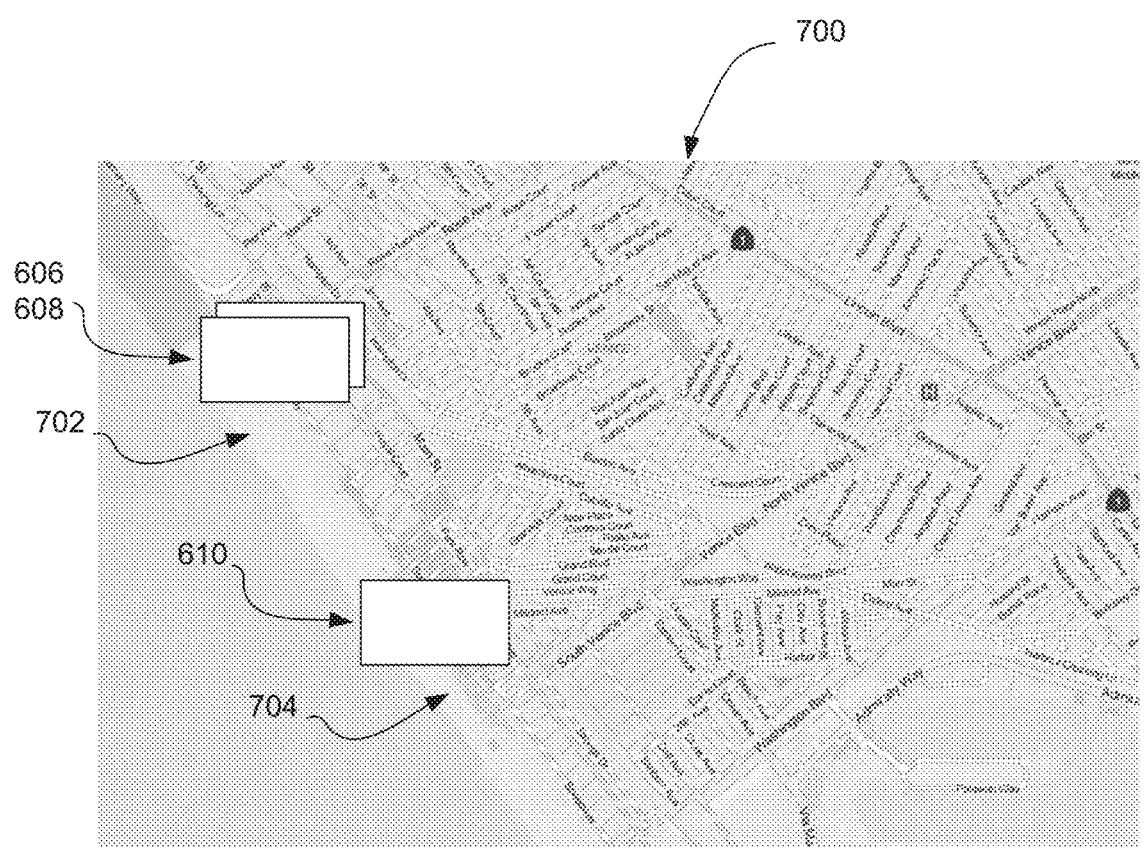
FIG. 7B shows another example of a graphical user interface illustrating media items placed at their respective geolocations on a map.

FIG. 7B shows another example of the map 700 illustrating thumbnails of selected pictures 606, 608, and 610 placed at their respective geolocation boundaries 702 and 704 on the map 700.

Figure 8A:
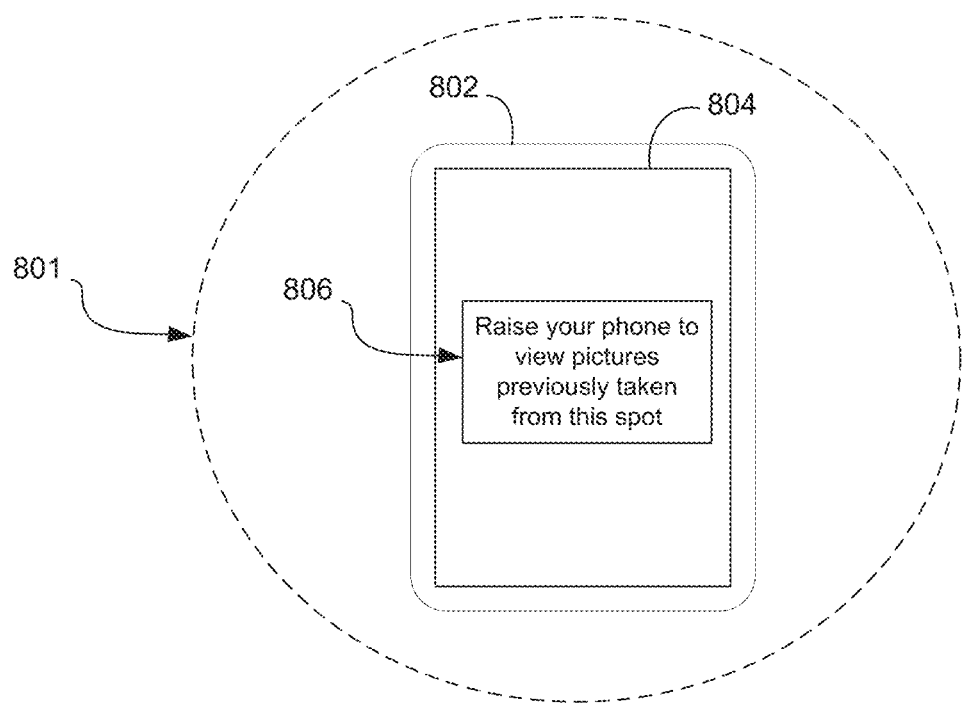
FIG. 8A shows an example of a notification to view a media item based on a geolocation of the mobile device.

FIG. 8A shows an example of a notification to view a media item based on a geolocation of a mobile device. A mobile device 802 determines that it is located within a geolocation boundary 801 of a previously selected picture. The mobile device 802 generates a notification 806 in a display 804. The notification 806 informs the user of the mobile device 802 to hold the mobile device 802 up (or raise the mobile device to an eye level position) to view the selected picture that was previously captured from the same spot. The previously selected picture may have been captured with the mobile device 802 or using another mobile device.

Figure 8B:
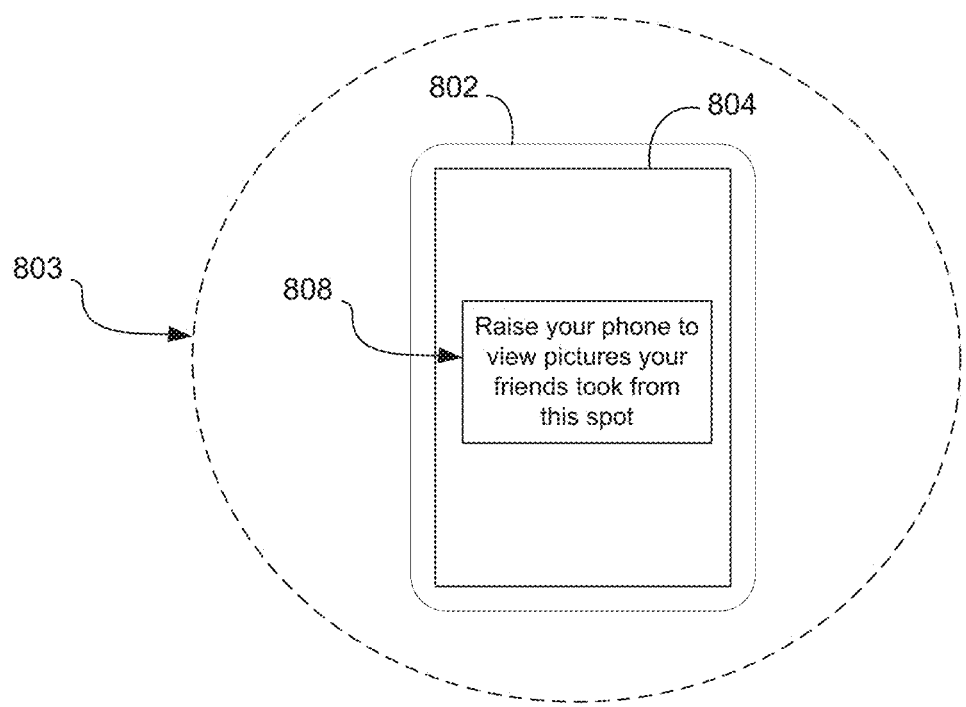
FIG. 8B shows an example of a notification to view a shared media item based on a geolocation of the mobile device.

FIG. 8B shows an example of a notification to view a shared media item based on a geolocation of the mobile device 802. The mobile device 802 determines that it is located within a geolocation boundary 803 of a shared picture. The mobile device 802 generates a notification 808 in the display 804. The notification 808 informs the user of the mobile device 802 to hold the mobile device 802 up to view the shared picture that was captured from the same spot.

Figure 8C:
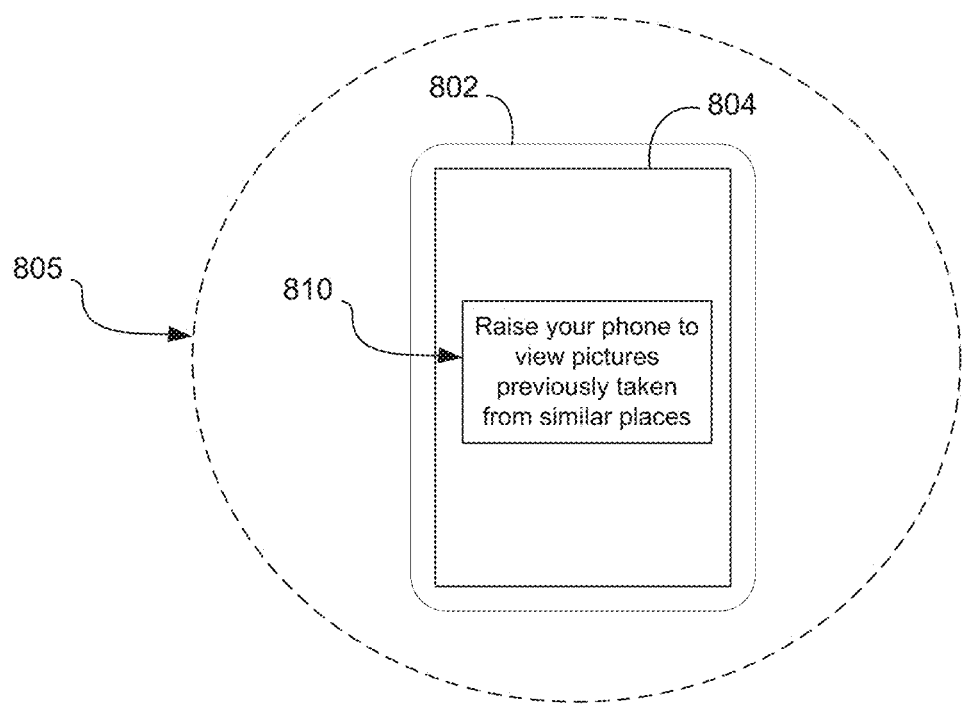
FIG. 8C shows another example of a notification to view a media item based on a geolocation of the mobile device.

FIG. 8C shows another example of a notification to view a media item based on a geolocation of the mobile device 802. The mobile device 802 determines that it is located within a geolocation boundary 805 of a previously selected picture. The picture was captured at a different geolocation from the geolocation boundary 805. The picture was placed on a map corresponding to the geolocation boundary 805. The mobile device 802 generates a notification 810 in the display 804. The notification 810 informs the user of the mobile device 802 to hold the mobile device 802 up to view the selected picture that was captured at another geolocation. In another example embodiment, pictures taken from similar places may share their geolocation boundaries. For example, the mobile device 802 may associate a picture taken at a sushi restaurant with a geolocation of other known sushi restaurants. So when the user of the mobile device 802 walks into any sushi restaurant, the user will have immediate access to all the pictures the user previously took at other sushi restaurants. The user can thus compare the sushi from the current restaurant with pictures of sushi from sushi restaurants the user previously visited.

In another similar example, the user of the mobile device 802 takes a picture of a citrus tree at the Home Depot. The user then proceeds with taking many pictures from other events such as birthday parties. When the user later walks into a different hardware store, such as Lowes, to compare the price of the same type of citrus tree from the Home Depot, the user would typically browse through many pictures previously taken at the birthday parties before reaching the picture of the citrus tree taken at the Home Depot. The media display application 112 avoids this problem by placing the picture of the citrus tree at geolocations of other hardware stores in the area. As such, the mobile device 802 displays the picture of the citrus tree taken at the Home Depot as soon as the user walks into any hardware store.

Figure 8D:
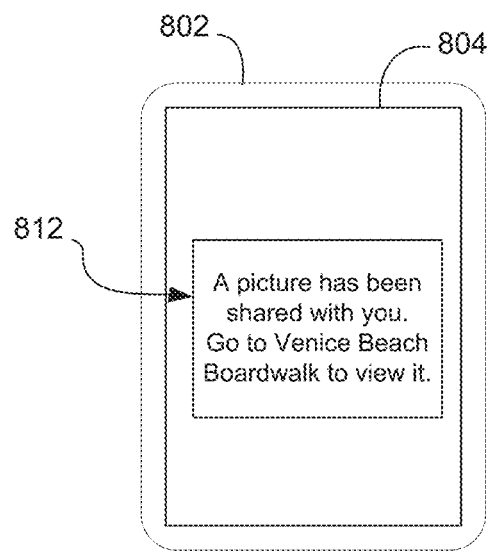
FIG. 8D shows an example of a notification including instructions on how to view a shared media item at the mobile device.

FIG. 8D shows an example of a notification including instructions on how to access a shared media item at a mobile device. The mobile device 802 receives a message that includes a shared picture and access conditions. The mobile device 802 can only view the shared picture when the mobile device 802 meets the access conditions. The mobile device 802 generates a notification 812 in the display 804. For example, the notification 810 informs the user of the mobile device 802 to go to a specific geolocation based on the access conditions to access and view the shared picture.

Figure 8E:
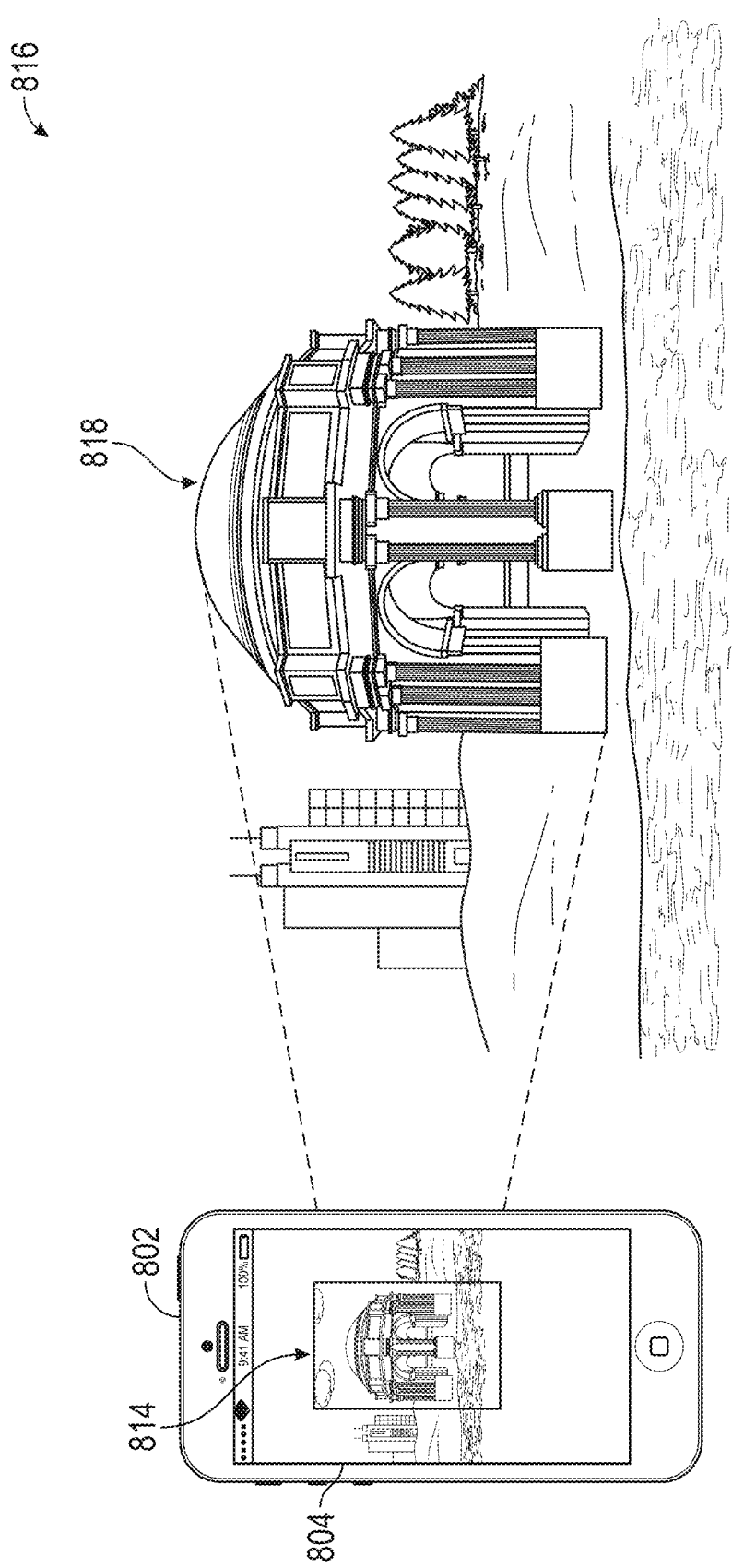
FIG. 8E shows an example of a display of a previously selected picture in a mobile device.

FIG. 8E shows an example of a display of a previously selected picture in a mobile device. The mobile device 802 is at a spot where the previously selected picture was captured. The mobile device 802 is also pointed in about the same direction that the mobile device 802 was pointed when the previously selected picture was captured. For example, the mobile device 802 is pointed towards a landscape 816 including a landmark 818. The user of the mobile device 802 previously captured a picture of the landmark 818. When the user holds up the mobile device 802, the previously captured picture 814 is overlaid on top of a current view of the landscape 816 in the display 804. In another example, a time filter may be applied to the previously selected pictures to display only pictures taken within the last year or any other predefined period of time.

Figure 9A:
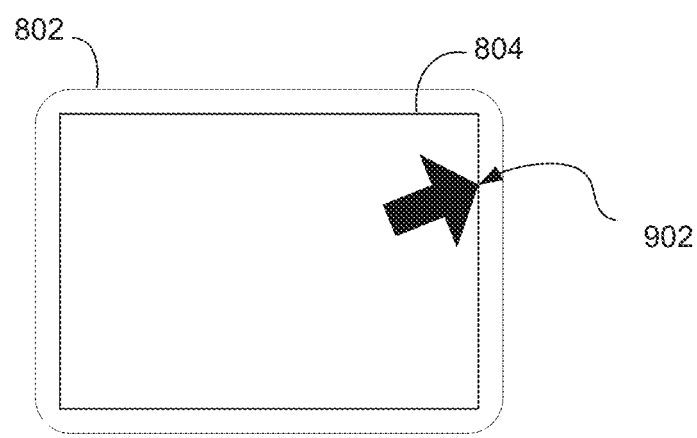
FIG. 9A is a diagram illustrating an example of a visual guide in a graphical user interface for accessing a media item at a geolocation of the mobile device.

FIG. 9A is a diagram illustrating an example of a visual guide in a graphical user interface for accessing a media item at a geolocation of a mobile device. Once the mobile device 802 is at a geolocation specified in the access conditions, the display 804 includes a visual guide 902 to help the user orient the mobile device 802 to view the media items. For example, the display 804 displays the visual guide 902 in the form of an arrow to guide the user to move the mobile device 804 in the direction indicated by the arrow.

Figure 9B:
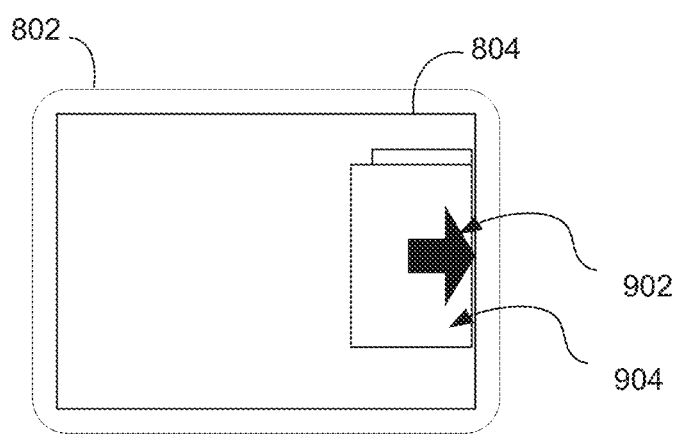
FIG. 9B is a diagram illustrating another example of a visual guide in a graphical user interface for accessing a media item at a geolocation of the mobile device.

FIG. 9B is a diagram illustrating another example of a visual guide in a graphical user interface for accessing a media item at a geolocation of a mobile device. The display 804 shows a portion of the media items 904 as the position of the mobile device 802 gets closer to the position boundary defined by the access conditions of the media items.

Figure 9C:
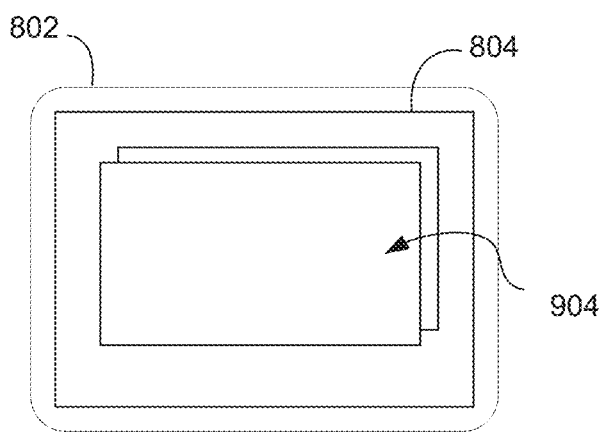
FIG. 9C is a diagram illustrating an example of a graphical user interface for accessing a media item at a geolocation of the mobile device.

FIG. 9C is a diagram illustrating an example of a graphical user interface for accessing a media item at a geolocation of the mobile device. The display position of the media items 904 is adjusted relative to the display 804 of the mobile device 802 based on the position of the mobile device 802 relative to the position boundary for the media items.

Figure 10A:
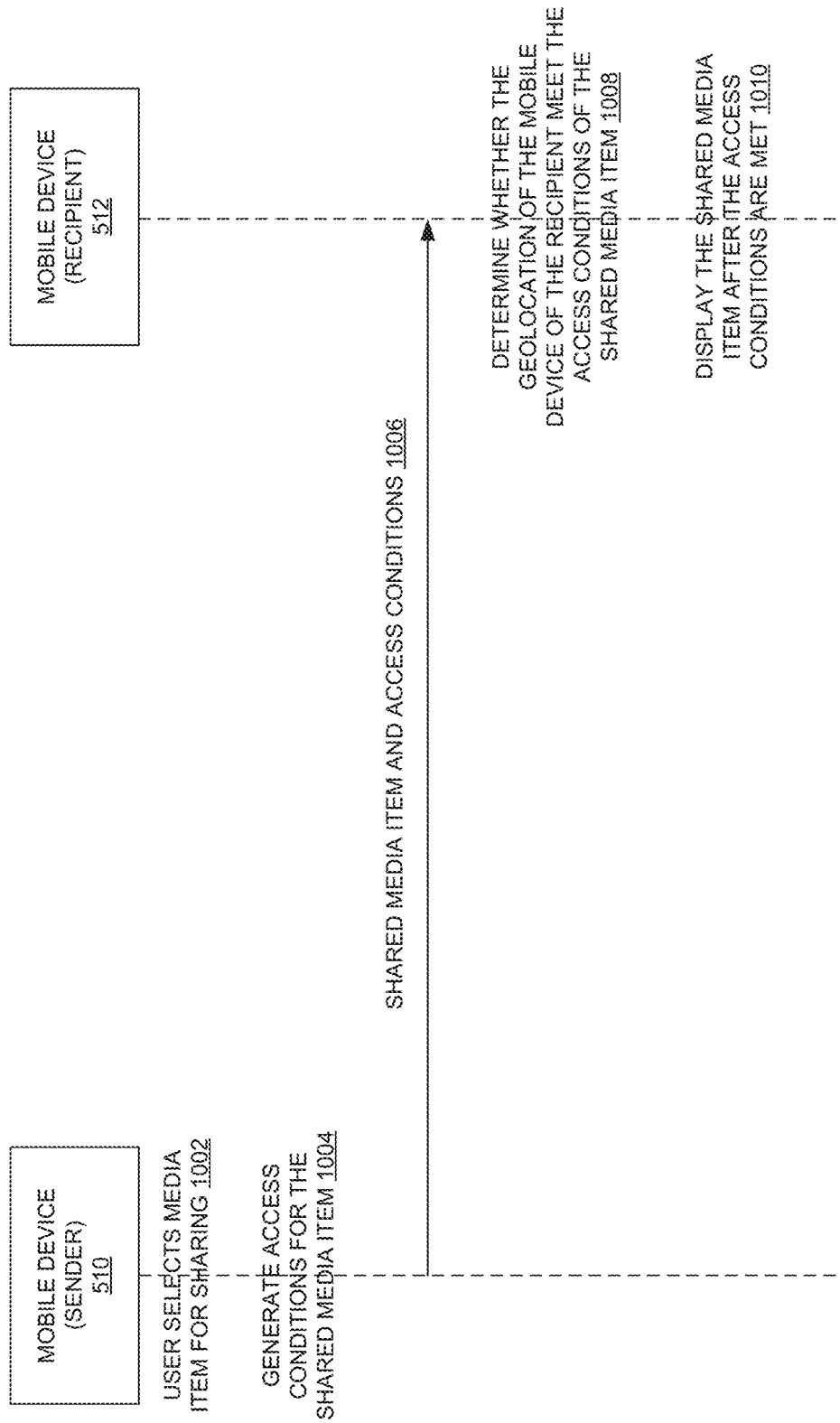
FIG. 10A shows an interaction diagram illustrating one example embodiment of a process for sharing a media item.

FIG. 10A shows an interaction diagram illustrating one example embodiment of a process for sharing a media item. A user of the mobile device 510 selects a media item for sharing at operation 1002. In one example, operation 1002 may be implemented using the media capture application 108 of FIG. 1. The mobile device 510 generates access conditions for the shared media item at operation 1004. In one example, operation 1004 may be implemented using the media placement application 110 of FIG. 1. The mobile device 510 sends the shared media item and corresponding access conditions to the mobile device 512 at operation 1006. In one example, operation 1006 may be implemented using the media sharing application 114 of FIG. 1. The mobile device 512 determines whether the geolocation (and optionally the physical position) of the mobile device 512 meet the access conditions of the shared media item at operation 1008. In one example, operation 1008 may be implemented using the media display application 112, of FIG. 1. The mobile device 512 generates a display of the shared media item after the access conditions of the shared media item are met at operation 1010. In one example, operation 1010 may be implemented using the media display application 112 of FIG. 1.

Figure 10B:
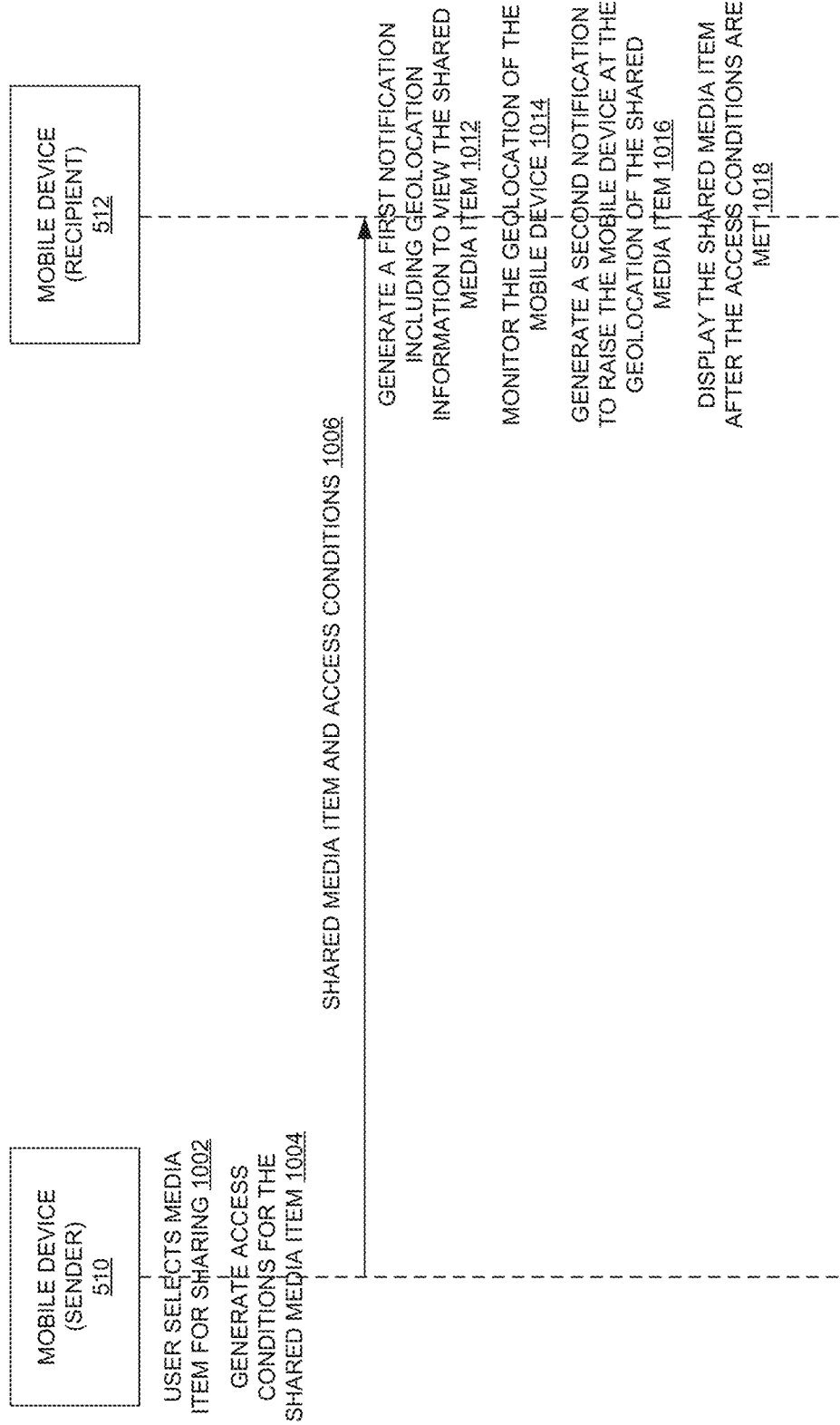
FIG. 10B shows an interaction diagram illustrating another example embodiment of a process for sharing a media item.

FIG. 10B shows an interaction diagram illustrating another example embodiment of a process for sharing a media item. A user of the mobile device 510 selects a media item for sharing at operation 1002. The mobile device 510 generates access conditions for the shared media item at operation 1004. The mobile device 510 sends the shared media item and corresponding access conditions to a mobile device 512 at operation 1006. The mobile device 512 generates a first notification to instruct the user of the mobile device 512 to go to a specific geolocation to access and view the shared media item at operation 1012. The mobile device 512 monitors the geolocation of the mobile device 512 at operation 1014. The mobile device 512 generates a second notification to instruct the user of the mobile device 512 to raise the mobile device 512 in a particular direction to view the shared media item at operation 1016. The mobile device 512 displays the shared media item after the mobile device 512 meets the access conditions at operation 1018. In one example, operations 1012, 1014, 1016, and 1018 may be implemented using the media display application 112 of FIG. 1.

Figure 10C:
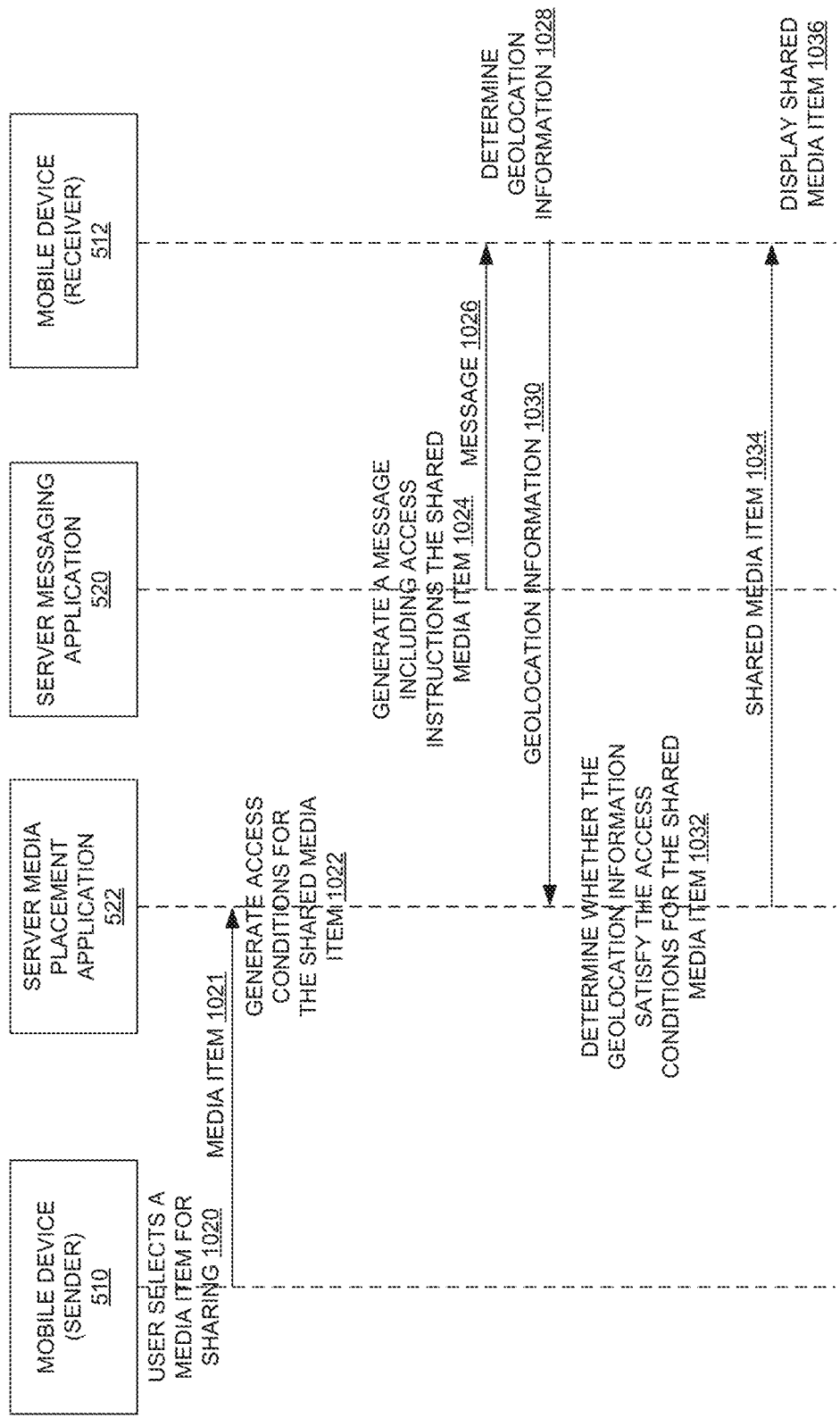
FIG. 10C shows an interaction diagram illustrating yet another example embodiment of a process for sharing a media item.

FIG. 10C shows an interaction diagram illustrating yet another example embodiment of a process for sharing a media item. A user of the mobile device 510 selects a media item for sharing at operation 1020. The mobile device 510 communicates the shared media item to the server media placement application 522 of FIG. 5 at operation 1021. The server media placement application 522 generates access conditions for the shared media item at operation 1022. The server messaging application 520 generates a message including access instructions to the shared media item at operation 1024. The server messaging application 520 sends the message to the mobile device 512 at operation 1026. The mobile device 512 determines its geolocation at operation 1028. The mobile device 512 sends its geolocation information to the server media placement application 522 at operation 1030. The server media placement application 522 determines whether the geolocation information satisfies the access conditions for the shared media item at operation 1032. The server media placement application 522 sends the shared media item after access conditions for the shared media item are met at operation 1034. The mobile device 512 generates a display of the shared media item at operation 1036.

Figure 11:
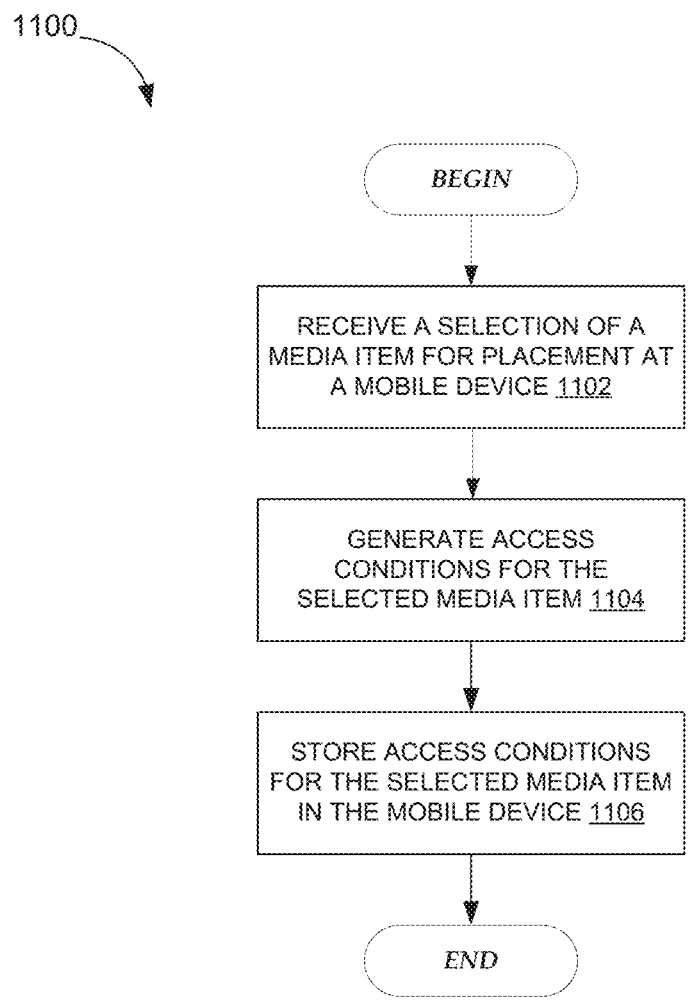
FIG. 11 shows a flow diagram illustrating one example embodiment of a method for generating access conditions for a selected media item.

FIG. 11 shows a flow diagram illustrating one example embodiment of a method 1100 for generating access conditions for a selected media item. At operation 1102, a mobile device receives a selection of a media item for placement. At operation 1104, the mobile device generates access conditions for the selected media item. At operation 1106, the mobile device stores the access conditions for the selected media item at the mobile device. In one embodiment, operations 1102, 1104, and 1106 may be implemented using the media placement application 110 of FIG. 1.

Figure 12:
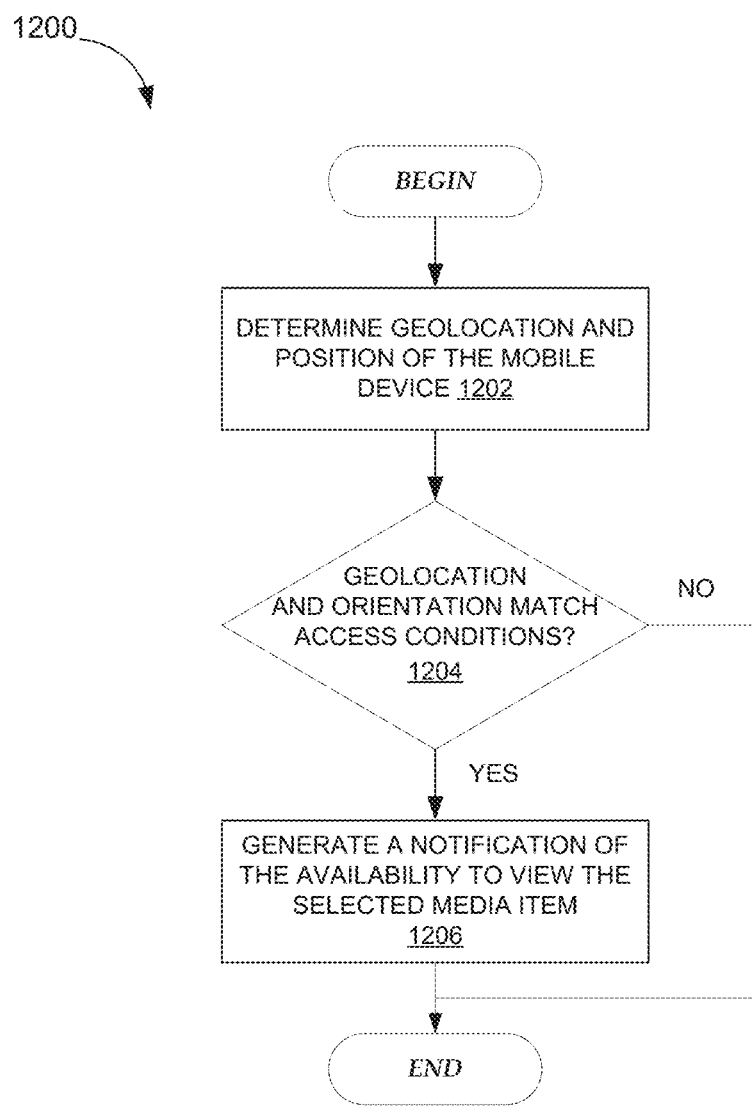
FIG. 12 shows a flow diagram illustrating another example embodiment of a method for accessing a selected media item.

FIG. 12 shows a flow diagram illustrating another example embodiment of a method 1200 for accessing the selected media item. At operation 1202, a mobile device determines its current geolocation and position. At operation 1204, the mobile device determines whether a combination of its current geolocation and position match or satisfy the access conditions generated at operation 1104 of FIG. 11. At operation 1206, the mobile device generates a notification of the availability to view the selected media item associated with the access conditions. In one embodiment, operations 1202, 1204, and 1206 may be implemented using the media display application 112 of FIG. 1.

Figure 13:
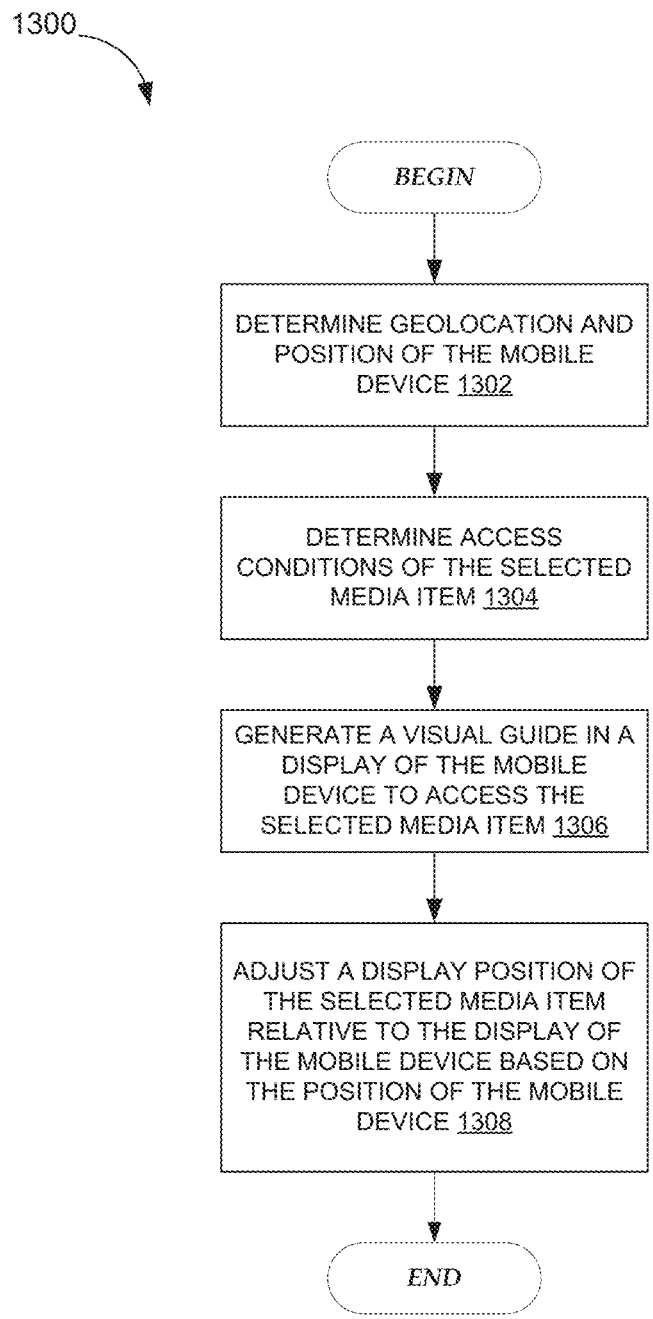
FIG. 13 shows a flow diagram illustrating one example embodiment of a method for generating a visual guide to access a selected media item.

FIG. 13 shows a flow diagram illustrating one example embodiment of a method 1300 for generating a visual guide to access the selected media item. At operation 1302, a mobile device determines its geolocation and position. At operation 1304, the mobile device determines access conditions for a selected media item. At operation 1306, the mobile device generates a visual guide in a display of the mobile device to access the selected media item. At operation 1308, the mobile device adjusts a display position of the selected media item related to the display of the mobile device based on the position of the mobile device. In one embodiment, operations 1302, 1304, and 1306 may be implemented using the media display application 112 of FIG. 1.

Figure 14:
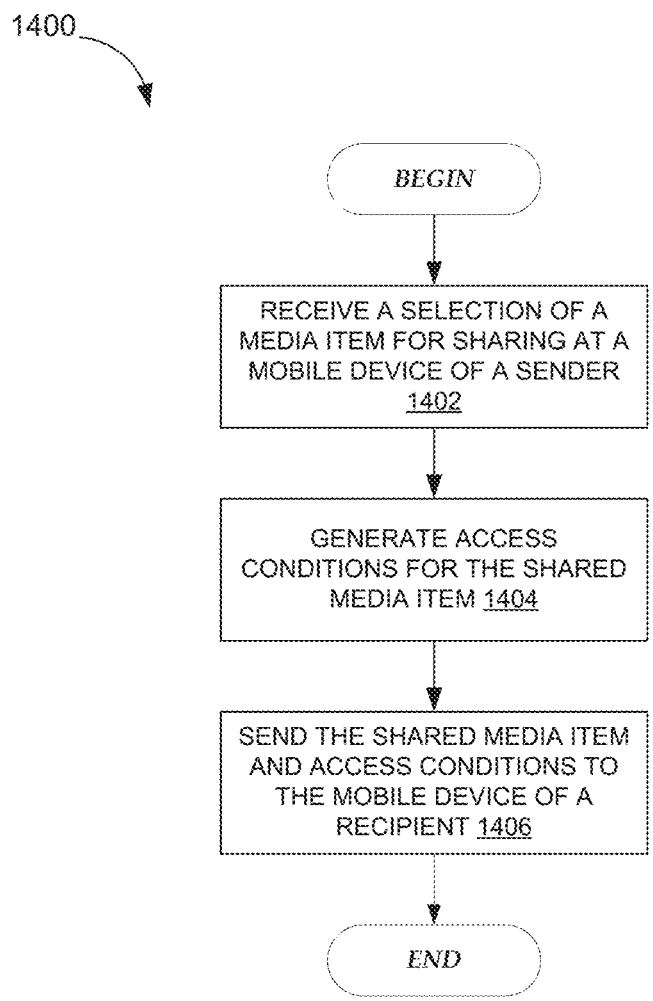
FIG. 14 shows a flow diagram illustrating one example embodiment of a method for sharing a media item.

FIG. 14 shows a flow diagram illustrating one example embodiment of a method 1400 for sharing a media item. At operation 1402, a user selects, at a mobile device, a media item for sharing with another mobile device. At operation 1404, the mobile device generates access conditions for the shared media item. At operation 1406, the mobile device sends the shared media item and the access conditions to the other mobile device. In one embodiment, operations 1402 and 1404 may be implemented using the media placement application 110 of FIG. 1. Operation 1406 may be implemented using the media sharing application 114 of FIG. 1.

Figure 15:
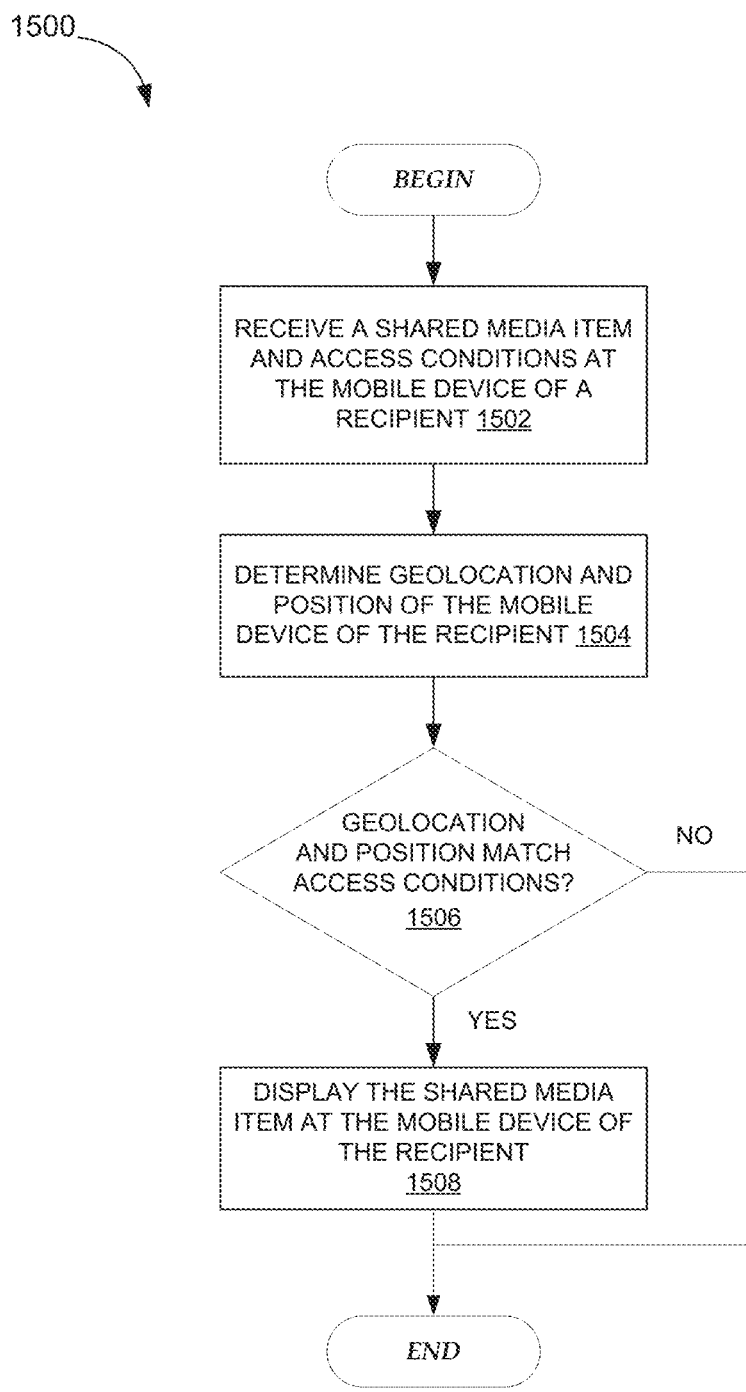
FIG. 15 shows a flow diagram illustrating one example embodiment of a method for accessing a shared media item.

FIG. 15 shows a flow diagram illustrating one example embodiment of a method 1500 for accessing a shared media item. At operation 1502, a mobile device receives a shared media item and corresponding access conditions. At operation 1504, the mobile device determines its current geolocation and position. At operation 1506, the mobile device determines whether a combination of its geolocation and position match the received access conditions. At operation 1508, the mobile device displays the shared media item when the access conditions are met. Operations 1502, 1504, 1506, and 1508 may be implemented using the media display application 112.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured. (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically, constructed, permanently configured (e.g., hardwired), or temporarily or transitorily configured (e.g., programmed) to operate in a certain manner or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via the network 504 (e.g., the Internet) and via one or more appropriate interfaces (e.g., APIs), Electronic Apparatus and System Example embodiments may be implemented in digital electronic circuitry, or in computer hardware, firmware, or software, or in combinations of them. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed in various example embodiments.

Example Computer System

Figure 16:
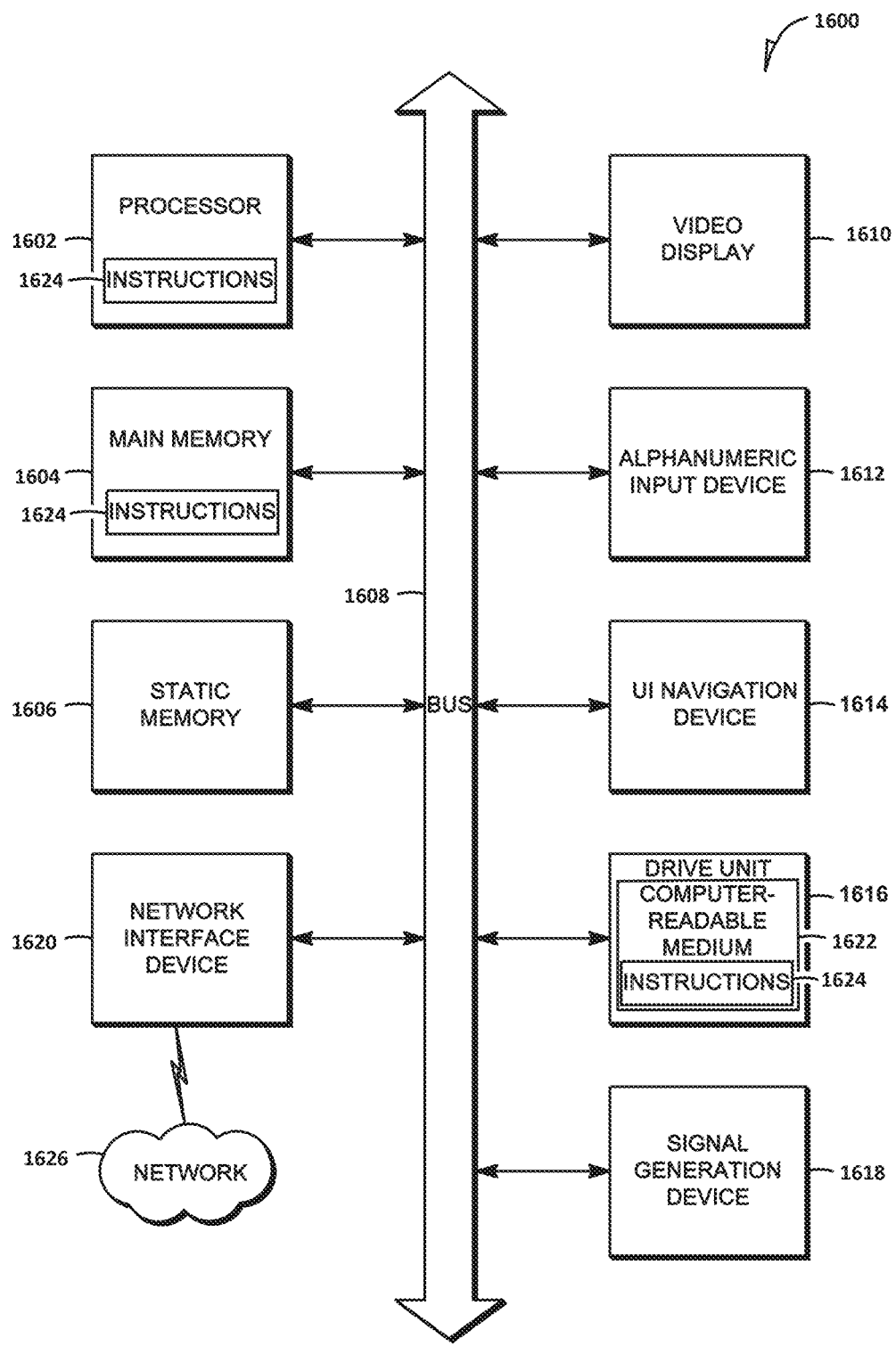
FIG. 16 shows a diagrammatic representation of machine, in the example form of a computer system, within which a set of instructions may be executed to cause the machine to perform any one or more of the methodologies discussed herein.

FIG. 16 shows a diagrammatic representation of a machine in the example form of a machine or computer system 1600 within which a set of instructions 1624 may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine and in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions 1624 (sequential or otherwise) that specify actions to be taken by that machine. Further, while only a single machine is illustrated, the term "machine" shall also be taken to include any collection of machines that individually or jointly execute a set (or multiple sets) of instructions 1624 to perform any one or more of the methodologies discussed herein.

The example computer system 1600 includes a processor 1602 (e.g., a central processing unit (CPU), a graphics processing unit (GPU), or both), a main memory 1604, and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a UI navigation device 1614 (e.g., a mouse), a drive unit 1616, a signal generation device 1618 (e.g., a speaker), and a network interface device 1620.

The drive unit 1616 includes a computer-readable medium 1622 on which is stored one or more sets of data structures and instructions 1624 (e.g., software) embodying or utilized by any one or more of the methodologies or functions described herein. The instructions 1624 may also reside, completely or at least partially, within the main memory 1604 or within the processor 1602 during execution thereof by the computer system 1600, with the main memory 1604 and the processor 1602 also constituting machine-readable media.

The instructions 1624 may further be transmitted or received over a network 1626 via the network interface device 1620 utilizing any one of a number of well-known transfer protocols (e.g., HTTP).

While the computer-readable medium 1622 is shown in an example embodiment to be a single medium, the term "computer-readable medium" should be taken to include a single medium or multiple media (e.g., a centralized or distributed database, and/or associated caches and servers) that store the one or more sets of instructions 1624. The term "computer-readable medium" shall also be taken to include any medium that is capable of storing, encoding, or carrying a set of instructions 1624 for execution by the machine that cause the machine to perform any one or more of the methodologies of the present disclosure, or that is capable of storing, encoding, or carrying data structures utilized by or associated with such a set of instructions 1624. The term "computer-readable medium" shall, accordingly, be taken to include, but not be limited to, solid-state memories, optical media, and magnetic media.

Furthermore, the machine-readable medium is non-transitory in that it does not embody a propagating signal. However, labeling the tangible machine-readable medium "non-transitory" should not be construed to mean that the medium is incapable of movement—the medium should be considered as being transportable from one physical location to another. Additionally, since the machine-readable medium is tangible, the medium may be considered to be a machine-readable device.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Such embodiments of the inventive subject matter may be referred to herein, individually or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computing device comprising:
a processor; and
a memory storing instructions that, when executed by the processor, configure the computing device to perform operations comprising:
capturing a first media item at a geographic location during a first time metric;
receiving an identification of a geographic boundary and a first direction point of the computing device related to the first media item at the first time metric;
detecting that the computing device is located within the geographic location and boundary at a second time metric;
detecting that the computing device is oriented at the first direction point within the geographic location and boundary during the second time metric;
generating a media content time filter;
applying the media content time filter to a plurality of previously captured media items to display the plurality of previously captured media items based on a predetermined period of time;
and
causing the first media item to be overlaid on top of a portion of the second media item in a display of the computing device in response to detecting that the computing device is oriented at the first direction point within the geographic location and boundary during the second time metric.

2. The computing device of claim 1, further comprising:
a Global Positioning System (GPS) sensor configured to identify a geolocation of the computing device;
an orientation sensor configured to identify an orientation of the computing device; and
a camera configured to generate the media item.

3. The computing device of claim 1, wherein first media item and second media item comprises an image, a picture, an icon, or a video.

4. The computing device of claim 1, wherein the geographic location comprises a location identified on a geographic map in which the computing device is located.

5. The computing device of claim 1, wherein the geographic boundary includes an area based on a preset distance radius from a center associated with the geographic location during the first time metric.

6. The computing device of claim 5, wherein the first time metric comprises a date and a time of when the first media item was captured.

7. The computing device of claim 1, wherein the instructions further configure the computing device to:
generate a notification in the computing device that the first media item overlaid on top of the portion of the second media item is available to view in the display of the computing device.

8. A method comprising:
capturing a first media item at a geographic location during a first time metric;
receiving an identification of a geographic boundary and a first direction point of the computing device related to the first media item at the first time metric;
detecting that the computing device is located within the geographic location and boundary at a second time metric;
detecting that the computing device is oriented at the first direction point within the geographic location and boundary during the second time metric;
generating a media content time filter;
applying the media content time filter to a plurality of previously captured media items to display the plurality of previously captured media items based on a predetermined period of time;
and
causing the first media item to be overlaid on top of a portion of the second media item in a display of the computing device in response to detecting that the computing device is oriented at the first direction point within the geographic location and boundary during the second time metric.

9. The method of claim 8, wherein the first media item and second media item comprises an image, a picture, an icon, or a video.

10. The method of claim 8, wherein the geographic location comprises a location identified on a geographic map in which the computing device is located.

11. The method of claim 8, wherein the geographic boundary includes an area based on a preset distance radius from a center associated with the geographic location during the first time metric.

12. The method of 11, wherein the first time metric comprises a date and a time of when the first media item was captured.

13. The method of claim 8, further comprising:
generating a notification in the computing device that the first media item overlaid on top of the portion of the second media item is available to view in the display of the computing device.

14. A non-transitory computer-readable storage medium storing a set of instructions that, when executed by a processor of a machine, cause the machine to perform operations comprising:
capturing a first media item at a geographic location during a first time metric;
receiving an identification of a geographic boundary and a first direction point of the computing device related to the first media item at the first time metric;
detecting that the computing device is located within the geographic location and boundary at a second time metric;
detecting that the computing device is oriented at the first direction point within the geographic location and boundary during the second time metric;
generating a media content time filter;
applying the media content time filter to a plurality of previously captured media items to display the plurality of previously captured media items based on a predetermined period of time;
and
causing the first media item to be overlaid on top of a portion of the second media item in a display of the computing device in response to detecting that the computing device is oriented at the first direction point within the geographic location and boundary during the second time metric.

15. The non-transitory computer-readable medium of claim 14, wherein the first time metric comprises a date and a time of when the first media item was captured.

16. The non-transitory computer-readable medium of claim 14, wherein the geographic boundary includes an area based on a preset distance radius from a center associated with the geographic location during the first time metric.

17. The non-transitory computer-readable medium of claim 14, further comprising:
generating a notification in a computing device that the first media item overlaid on top of the portion of the second media item is available to view in the display of the computing device.

18. The non-transitory computer-readable medium of claim 14, wherein the first media item and second media item comprises an image, a picture, an icon, or a video.

19. The non-transitory computer-readable medium of claim 14, wherein the geographic location comprises a location identified on a geographic map in which the computing device is located.

20. The non-transitory computer-readable medium of claim 19, wherein the notification comprises a plurality of graphical elements, the plurality of graphical element comprising an arrow pointed in a first direction.

* * * * *